US008909996B2

(12) United States Patent
Srinivasan et al.

(10) Patent No.: US 8,909,996 B2
(45) Date of Patent: Dec. 9, 2014

(54) UTILIZING MULTIPLE STORAGE DEVICES TO REDUCE WRITE LATENCY FOR DATABASE LOGGING

(75) Inventors: Kesavan P. Srinivasan, Hudson, OH (US); Boris Erlikhman, Mountain View, CA (US); Juan R. Loaiza, Woodside, CA (US); Jia Shi, Burlingame, CA (US); Alexander Tsukerman, Foster City, CA (US); Kothanda Umamageswaran, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 174 days.

(21) Appl. No.: 13/346,656

(22) Filed: Jan. 9, 2012

(65) Prior Publication Data
US 2013/0042156 A1 Feb. 14, 2013

Related U.S. Application Data

(60) Provisional application No. 61/523,221, filed on Aug. 12, 2011.

(51) Int. Cl.
G06F 11/00 (2006.01)
G06F 11/14 (2006.01)
G06F 11/20 (2006.01)
(52) U.S. Cl.
CPC ........ G06F 11/1443 (2013.01); G06F 11/1471 (2013.01); G06F 11/2074 (2013.01)
USPC ............................................... 714/54; 714/42

(58) Field of Classification Search
USPC .............................. 714/54, 42, 38.11, 718, 48
See application file for complete search history.

(56) References Cited

U.S. PATENT DOCUMENTS

| 7,219,260 | B1 * | 5/2007 | de Forest et al. ................. 714/15 |
| 8,108,640 | B1 * | 1/2012 | Holl, II .......................... 711/162 |
| 8,166,257 | B1 * | 4/2012 | Holl et al. ...................... 711/154 |
| 8,271,761 | B2 * | 9/2012 | Naganuma et al. ............. 711/173 |
| 8,527,721 | B2 * | 9/2013 | Atluri et al. .................... 711/162 |
| 2002/0016827 | A1 | 2/2002 | Mccabe et al. |
| 2003/0126387 | A1 | 7/2003 | Watanabe |
| 2008/0235294 | A1 | 9/2008 | Girkar |

FOREIGN PATENT DOCUMENTS

EP 1 498 815 A2 1/2005

* cited by examiner

*Primary Examiner* — Dieu-Minh Le
(74) *Attorney, Agent, or Firm* — Hickman Palermo Truong Becker Bingham Wong LLP

(57) ABSTRACT

Methods, computer-readable media, and computer systems are provided for initiating storage of data on multiple storage devices and confirming storage of the data after the data has been stored on one but not necessarily all of the devices. A storage server receives, from a client, a request to store data. In response to the request, the storage server initiates, in parallel, storage of the data on multiple storage systems. The storage server detects that the data has been stored on any one of the storage systems, such as an auxiliary system, and, in response, indicates, to the client, that the data has been stored. The storage server may flush or discard data on the auxiliary storage system upon detecting that the data has been successfully stored on a target storage system, where the data persists.

24 Claims, 5 Drawing Sheets

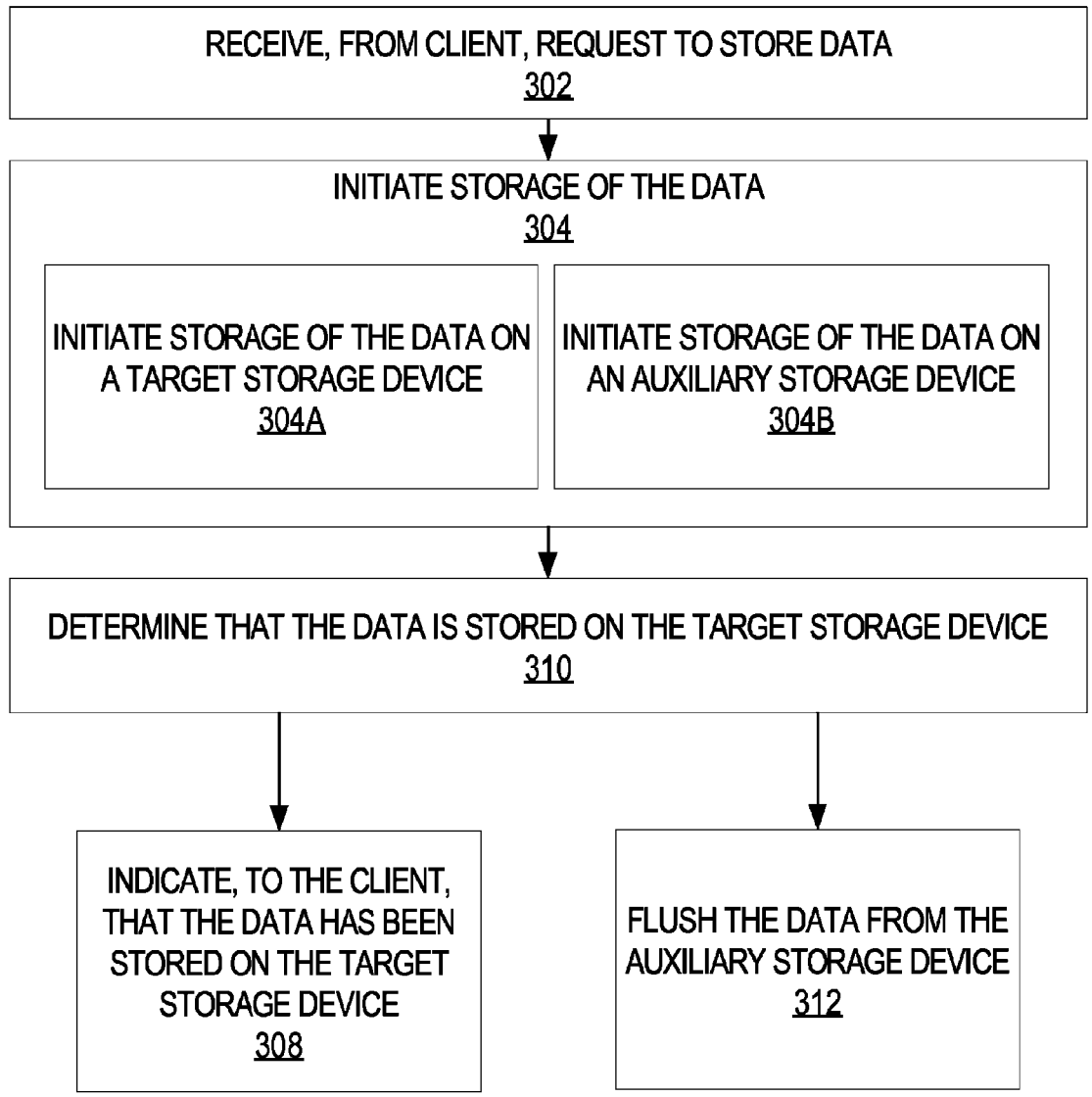

UTILIZING MULTIPLE STORAGE DEVICES TO REDUCE WRITE LATENCY FOR DATABASE LOGGING

RELATED APPLICATIONS; BENEFIT CLAIM

This application claims benefit of Provisional Application Ser. No. 61/523,221, entitled "Utilizing Multiple Storage Devices To Reduce Write Latency For Database Logging," filed Aug. 12, 2011, the entire contents of which is hereby incorporated by reference as if fully set forth herein, 35 U.S.C. §119(e).

This application is related to (1) U.S. Pat. No. 5,524,205, entitled "Methods and Apparatus for Optimizing Undo Log Usage," filed Apr. 21, 1993, the entire contents of which are incorporated by reference herein; (2) U.S. Pat. App. Pub. No. 2006/0101033, entitled "High-performance log-based processing," filed Nov. 5, 2004, the entire contents of which are incorporated by reference herein; and (3) U.S. Pat. No. 7,739,244, entitled "Operating logging for online recovery in shared memory information systems," filed Oct. 14, 2004, the entire contents of which are incorporated by reference herein.

FIELD OF THE INVENTION

The present disclosure relates to writing data to storage devices. In various examples, the present disclosure relates more particularly to writing log data to storage devices.

BACKGROUND

Logging

All computer systems may lose data if the computer crashes. Some systems, like database systems, are particularly susceptible to possible loss of data from system failure or crash because those systems transfer great amounts of data back and forth between disks and memory. The common reason for data loss is incomplete transfer of data from a volatile storage system (e.g., memory) to a persistent storage system (e.g., disk). Often the incomplete transfer occurs because a transaction is taking place when a crash occurs. A transaction generally includes the transfer of a series of records (or changes) between the two storage systems.

A transaction is "committed" when there is some guarantee that all the effects of the transaction are stable in the persistent storage. If a crash occurs before a transaction commits, the steps necessary for recovery are different from those necessary for recovery if the crash occurs after the transaction commits. Recovery is the process of restoring one or more database processes to a particular point.

The type of recovery depends, of course, on the reason for the loss of data. If a computer system crashes, the recovery enables the restoration of the persistent storage, e.g. disks, of the computer system to a state consistent with that produced by the last committed transactions. If the persistent storage crashes (called a media failure), the recovery recreates the data stored onto the disk.

Many approaches for recovering database systems involve the use of logs. Logs are merely lists of actions, often time-ordered, which indicate, at least in the case of database systems, what changes were made to the database and in what order those changes were made. The logs thus allow a computer system to place the database or database processes in a known and particular state which can then be used to redo or undo changes.

Logs may also be used in system configurations where a number of computer systems, called "nodes," access a collection of shared disks. This type of configuration is called a "cluster" or a "shared disk" system. A system that allows any nodes in such a system to access any of the data is called a "data sharing" system.

For example, a data processing system may include a plurality of nodes and a storage medium divided into sections. The nodes make changes to the sections by way of transactions. Each transaction comprises a series of changes made to at least one section by at least one node. Each transaction is committed if a record of the changes effected by that transaction as well as an indication of the completion of that transaction are reliably stored on the storage medium. Otherwise, the transaction is uncommitted. A redo log describes the nature of a transaction and provides enough information for the transaction to be redone. That is, the transaction can be repeated. An undo log describes the nature of a transaction and provides enough information for the transaction to be undone. That is, the effect of the transaction is removed. In log-based data systems, a data record can be recreated by obtaining a previously saved old copy of the data record and then applying logged actions to the old data record to recreate the record to the record's new current state.

With log-based processing, work is performed based on a description of the work in a set of records that are stored in a log. An example of log-based processing is system recovery processing. In log-based recovery, the log records represent a sequence of work items that are ordered operations on a set of objects. Specifically, the log records may be redo records that represent changes made to data items in a database prior to a system failure. Generally, recovering the system based on the log entails repeating the processing of the logged work items on the objects.

One context in which log-based processing may be performed is for recovery of a database system after a failure or inadvertent termination within the system. In the context of database recovery, the log is a redo log that records changes made during transactions on a set of objects. Some of the changes recorded in the redo log have been committed but not yet flushed to disk at the time of the failure. The set of objects are database objects, such as tables, rows, views, indexes, and the like. Thus, recovering the database system based on the redo log entails reapplying, to the database objects, changes reflected in the work items. Another context for log-based processing is recovery after media loss or persistent (disk) data corruption. This type of recovery typically involves restoring a backup of the data and then applying the log to replay all the changes since the time at which the backup was taken.

Log-based processing is not always in the context of system recovery. Rather, log-based processing may also be performed to repeat logged work on another system (e.g., to construct and maintain a standby database system), for auditing, for asynchronous event deliveries, for asynchronous change data capture, or for troubleshooting errors, alternatively or in addition to being performed for database restoration.

Typical approaches to log-based processing fall into two main categories. The first category involves serial schemes. With serial schemes, a single recovery process reads through the sequence of work items in the log and performs the work on the objects, one work item at a time. In large-scale systems with abundant resources, such a scheme does not take advantage of the available resources and leads to under-utilization of the system resources. For example, when there are multiple CPUs in the system, the recovery process may run in one of the CPUs without utilizing the other CPUs. Furthermore, serial schemes are not able to effectively overlap the CPU and I/O components of recovery processing. The second category of log-based processing involves parallel schemes.

With parallel schemes, multiple processes work together in parallel to perform log-based recovery. In parallel schemes, a plurality of worker processes work together in a coordinated manner to perform the workload recorded in the log. Some worker processes may be assigned to perform particular tasks for particular database objects, and some worker processes may be able to perform a variety of tasks for many database objects.

In a Write Ahead Logging (WAL) example, log records are created to track the changes made to the managed data. The log records include the old copy of managed data as well as the new copy. They also record the beginning and end of client actions. WAL guarantees that log records are persisted to a non-volatile storage medium, such as a disk, prior to persisting the actual managed data. Thus, in case of any failure, the server uses the log records that have been persisted to determine whether a given client action was partially completed or fully completed. The effect of partially completed client action is undone by using the old copy of managed data saved in log records to roll back the state of the managed data to the state it had prior to starting the client action. Similarly, the new copy of managed data saved in log records is used to roll forward the state of the managed data to reflect the changes made by fully completed client actions. In this manner, the server guarantees atomicity of client actions on managed data even in the presence of failures. Rollback and roll-forward together help achieve atomicity in a system.

Database logs are written to very frequently in Online Transaction Processing ("OLTP") environments. In the context of OLTP environments, much of the workload of the database system involves input and output ("I/O"). Specifically, the workload of the database system is largely retrieving information from tables stored on storage devices, caching the information that is used frequently, and supplying that information to database application workstations over a network. In general, the actual computational demands on database system are minimal, such as calculating the balance of a bank account. In many commercially available operating systems, the services that handle disk I/O are referred to as Async I/O, Direct I/O, raw device access, and striping.

In many cases, clients and applications are not allowed to proceed until certain information is known to have been written to the database log. Consequently, disk write times for database logs affect application response times and database system performance. However, database log write latencies are usually affected by the load of the disk system; if other disks are busy, the database log writes can often be slow, thus negatively impacting performance. Database log writes may be even slower when database log files are multiplexed or mirrored, which is often the case. The speed of the slowest disk may be the limiting factor for database log writes since data is written to all copies before processing can continue.

Improving database log write times may be accomplished by prioritizing I/Os, giving these writes priority over all other types of writes. This was done at the database level, not at the disk level. However, prioritizing I/Os at the database level is not effective when a log write arrives while the disk system is already busy with numerous other writes.

In another embodiment, the database log is placed on on a fast device, such as flash storage. However, database logs tend to be quite large, especially on OLTP systems. Valuable flash storage may not be available for allocation for the database logs. Additionally, even flash storage can sometimes be slow, due to wear leveling algorithms, for example.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

IN THE DRAWINGS

FIG. 5 illustrates an example process for initiating storage of data on both a target storage device and an auxiliary storage device, and flushing the data from the auxiliary storage device once the data has been stored on the target storage device.

DETAILED DESCRIPTION

Figure 1:
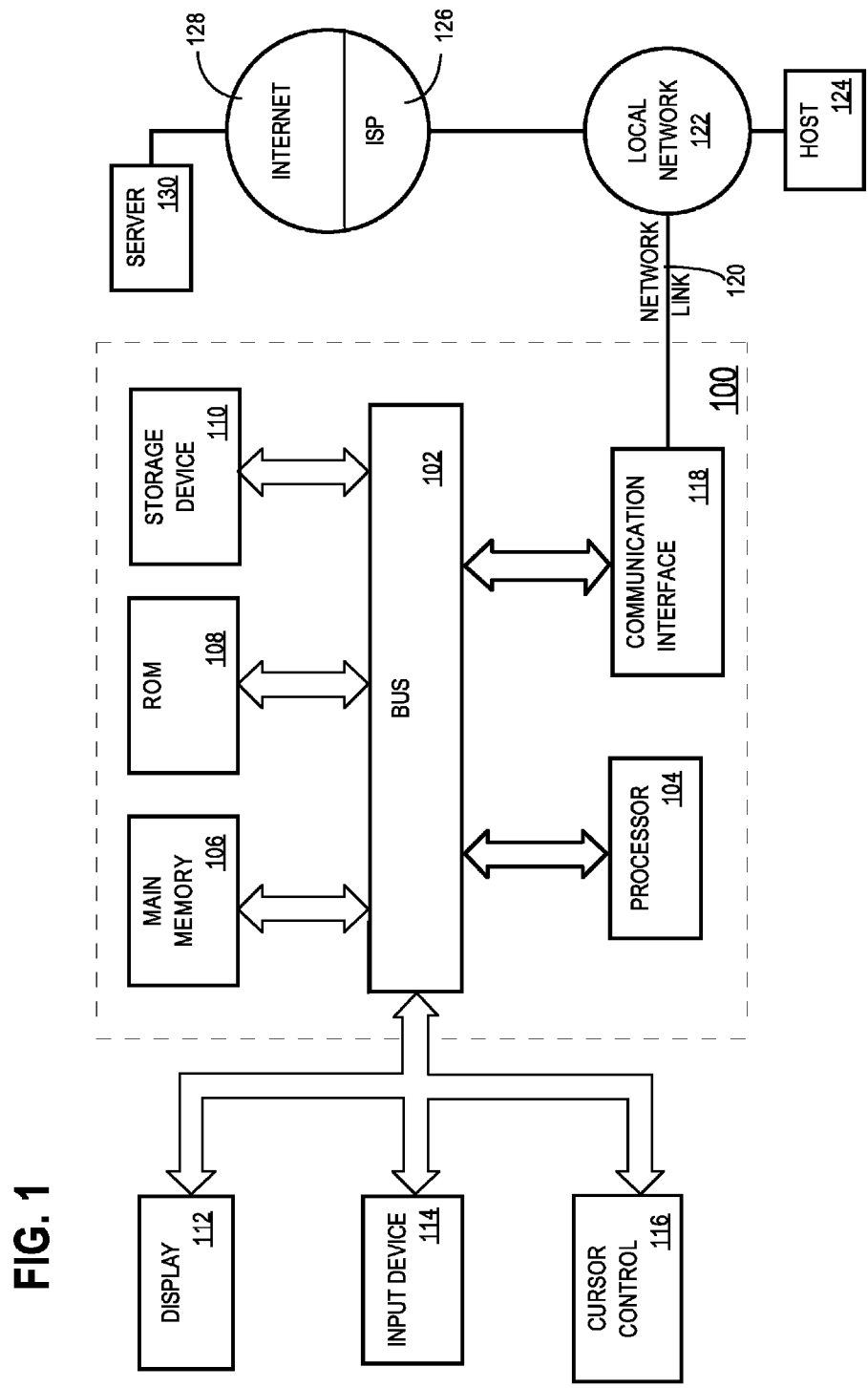
FIG. 1 illustrates an example computer system for implementing various example techniques as described herein.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

GENERAL OVERVIEW

Providing Early Confirmation of a Write Operation

Methods, computer-readable media, and computer systems are provided for initiating storage of data on two or more storage devices and confirming storage of the data after the data has been stored on one but not necessarily both of the devices. In one embodiment, a storage server receives, from a client, a request to store data. For example, the storage server may receive, on a specialized storage interface between client software and server software, data to be stored in a storage system. In response to the request, the storage server initiates, in parallel, storage of the data on multiple storage systems. For example, the storage server may initiate storage of the data on both a target storage system and an auxiliary storage system before the data has been stored on either of the storage systems. The storage server detects that the data has been stored on any one of the storage systems and, in response, indicates, to the client, that the data has been stored. Initiating storage of two or more copies of the data on two or more devices may be performed by the storage server, in response to a request to store a single copy of the data, in a manner that is transparent to the client.

The storage server does not need to wait for the data to be stored on all of the storage systems before indicating, to the client, that the data has been stored. For example, the storage server may indicate, to the client, that the data has been stored even if the data is temporarily stored on an auxiliary storage system and has not yet been persisted on a target storage system. The stored data may temporarily exist on both storage systems before the stored data is flushed from the auxiliary storage system. However, once the data has been stored in the target storage system, the data may or may not remain in the auxiliary storage system. The storage server may flush or discard data on the auxiliary storage system upon detecting that the data has been successfully stored on the target storage system.

In one embodiment, if an auxiliary storage system confirms storage of the data before a target storage system, the storage server may confirm, to the client, storage of the data even if the target storage system has not yet stored the data. In this manner, the storage server may provide an early confirmation of storage of the data to the client. The early confirmation may be provided before the storage server would have otherwise been able to provide a confirmation if the storage server had been waiting for confirmation from the target storage system. The early confirmation may be provided as soon as the quickest response is provided from one of the storage systems, and the storage server does not need to wait for storage on any particular system. One or multiple auxiliary storage systems may be used to possibly provide an early response when data is stored on a target storage system.

Providing an early confirmation that data has been stored is not the same as storing data redundantly. In redundant systems that do not provide an early confirmation, the data is mirrored to multiple storage devices, and the storage server waits for the data to be written to all of the multiple storage devices. After the data has been written to all of the multiple storage devices, the storage server may confirm that the data has been written redundantly. Redundant systems that do not provide an early confirmation force the storage server to wait for the slowest of the written-to storage devices.

The client may or may not choose to store data redundantly in a system that also provides the early confirmation. In one embodiment, the storage server may enforce redundancy on multiple managed storage devices. For example, in response to a request to store data redundantly on at least two devices, the storage server may initiate storage of the data on three, four, or more storage devices. In response to determining that two copies of the data have been stored redundantly on at least two of the storage devices, the storage server may confirm that the data has been stored redundantly even if the at least two storage devices are not the two target storage devices where the copies of the data are to be redundantly persisted, and even if the writes have not completed on others of the three, four, or more storage devices.

In another embodiment, multiple storage servers may operate together to achieve redundancy on multiple managed storage devices. Each of two or more storage servers may initiate storage of the data on two or more managed storage devices, and each storage server may confirm that the data has been stored when the storage server detects that any one of the managed storage devices has stored the data. A parent storage server operating above the multiple storage servers may confirm, to a client, that each of the storage servers has confirmed storage of at least one copy of the data on at least one managed storage device. If the different storage servers manage different storage devices, then such a confirmation would signify that the data has been stored redundantly.

In one embodiment, whether or not redundancy is achieved, a storage server receives a request to store data and confirms storage of the data in response to determining that the data has been stored on fewer than all of multiple separate storage systems. For example, the storage server may determine that the data has been stored on a first storage system of the separate storage systems. The storage server may detect a failure to store the data in a second storage system of the separate storage systems. In response to detecting the failure of the second storage system to store the data, the storage server may copy the data from the first storage system to a storage system other than the first storage system. For example, the storage server may copy the data from the first storage system to the second storage system or to a third storage system that is different and/or separate from the first and second storage systems. In one embodiment, if the storage server determines that a target storage system failed to store the data, the storage server initiates storage of the data on a third storage system as an alternate to the second storage system. The data may be discarded from or flushed from the first storage system once the storage server detects that the data has been copied to the storage system other than the first storage system.

In one embodiment, a storage server receives a request to store data and confirms storage of the data in response to determining that the data has been stored on fewer than all of multiple separate storage systems. Storage of the data may be allowed to complete on any or all of the multiple separate storage systems even though confirmation of the storage may be provided after the storage has completed on a single storage system or a subset of the storage systems. In other words, storage of the data may complete on one subset of storage systems before the storage server confirms that the data has been stored, and on another subset of storage systems after the storage server has confirmed that the data has been stored. Once the data has been stored on the storage systems, the data may be flushed or discarded from the auxiliary storage systems and retained on the target storage systems.

An auxiliary storage system may store data temporarily until the data has been stored on a target storage system. In other words, the auxiliary storage system stores a set of data that is awaiting storage on the target storage system, and the target storage system persistently stores data. If storage of the data completes on the auxiliary storage system before storage of the data completes on the target storage system, the storage server may confirm storage of the data even though the data has not yet been stored at a requested location. Once the data has been stored on the target storage system, the data may be discarded or flushed from the auxiliary storage system. In one example, a location storing the data on the auxiliary storage system is marked as locked, used, or un-writeable before confirmation that the data has been stored on the target storage system. The location storing the data is then unlocked, freed up, or marked as writeable after confirmation that the data has been stored on the target storage system.

Figure 2:
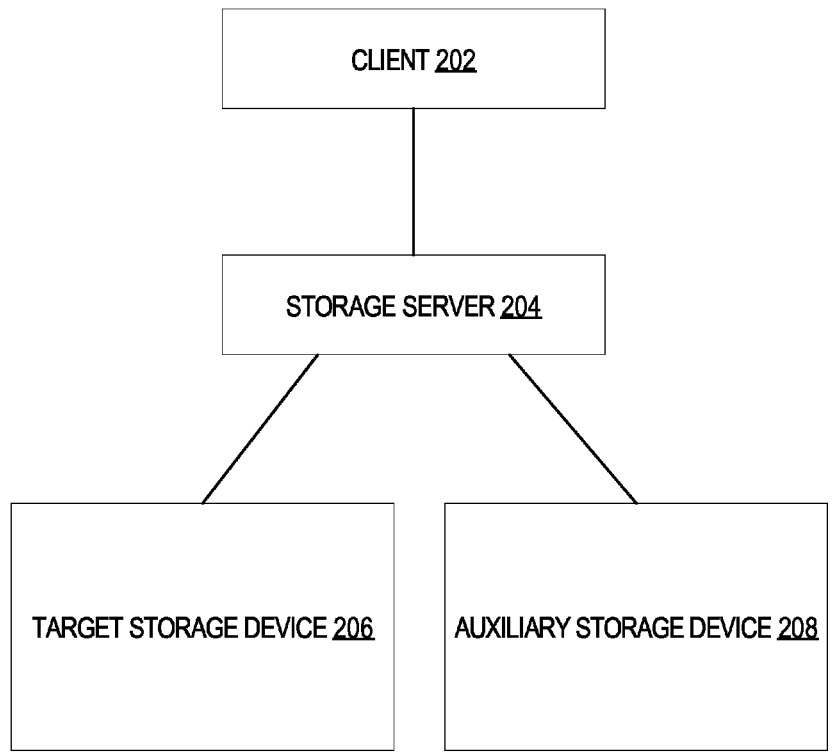
FIG. 2 illustrates an example client-server system for confirming storage of data once the data has been stored on either of a target storage device or an auxiliary storage device.

FIG. 2 illustrates an example system that includes a client 202, a storage server 204, and storage devices 206-208. Client 202 may send data to storage server 204. In response to receiving the data to be stored, storage server 204 issues two write operations: one to target storage device 206, and one to auxiliary storage device 208. Storage 204 may confirm, to client 202, that the data has been written when either target storage device 206 or auxiliary storage device 208 has successfully written the data.

Figure 3:
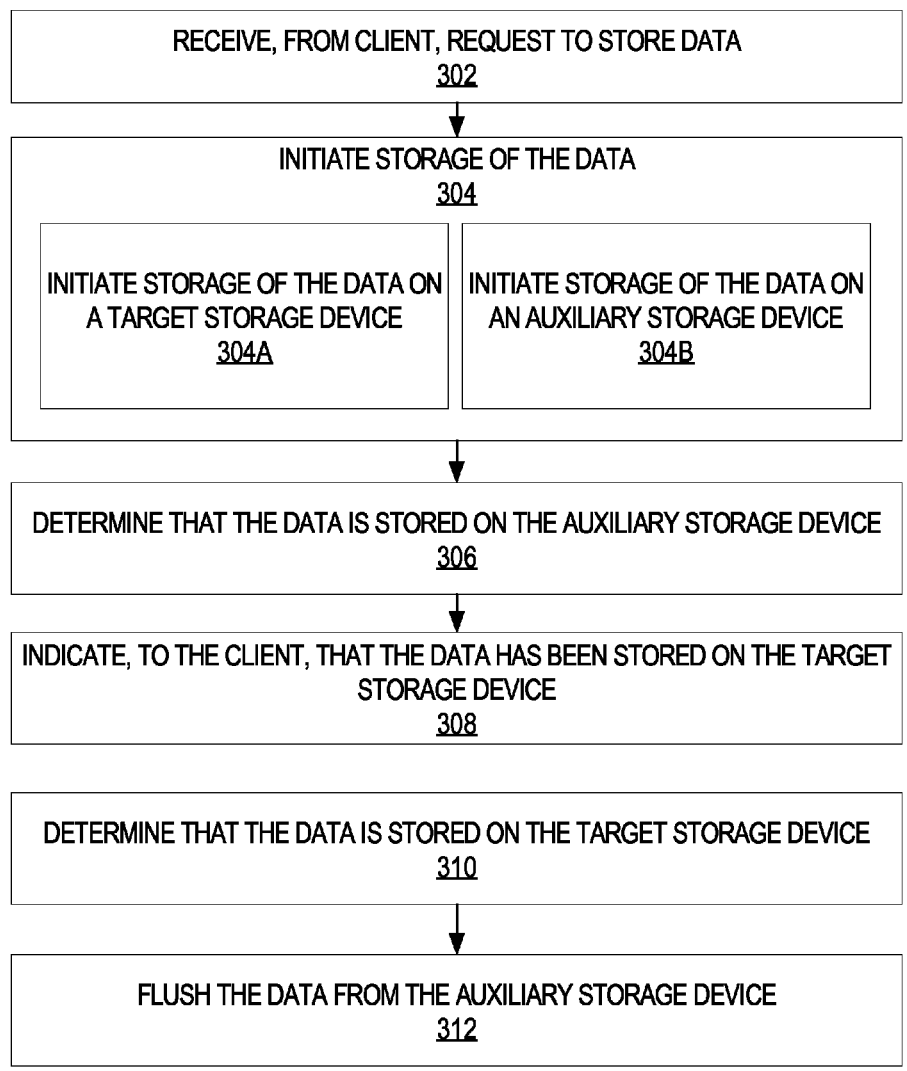
FIG. 3 illustrates an example process for initiating storage of data on both a target storage device and an auxiliary storage device, and confirming storage of the data once the data has been stored on the auxiliary storage device.
Figure 4:
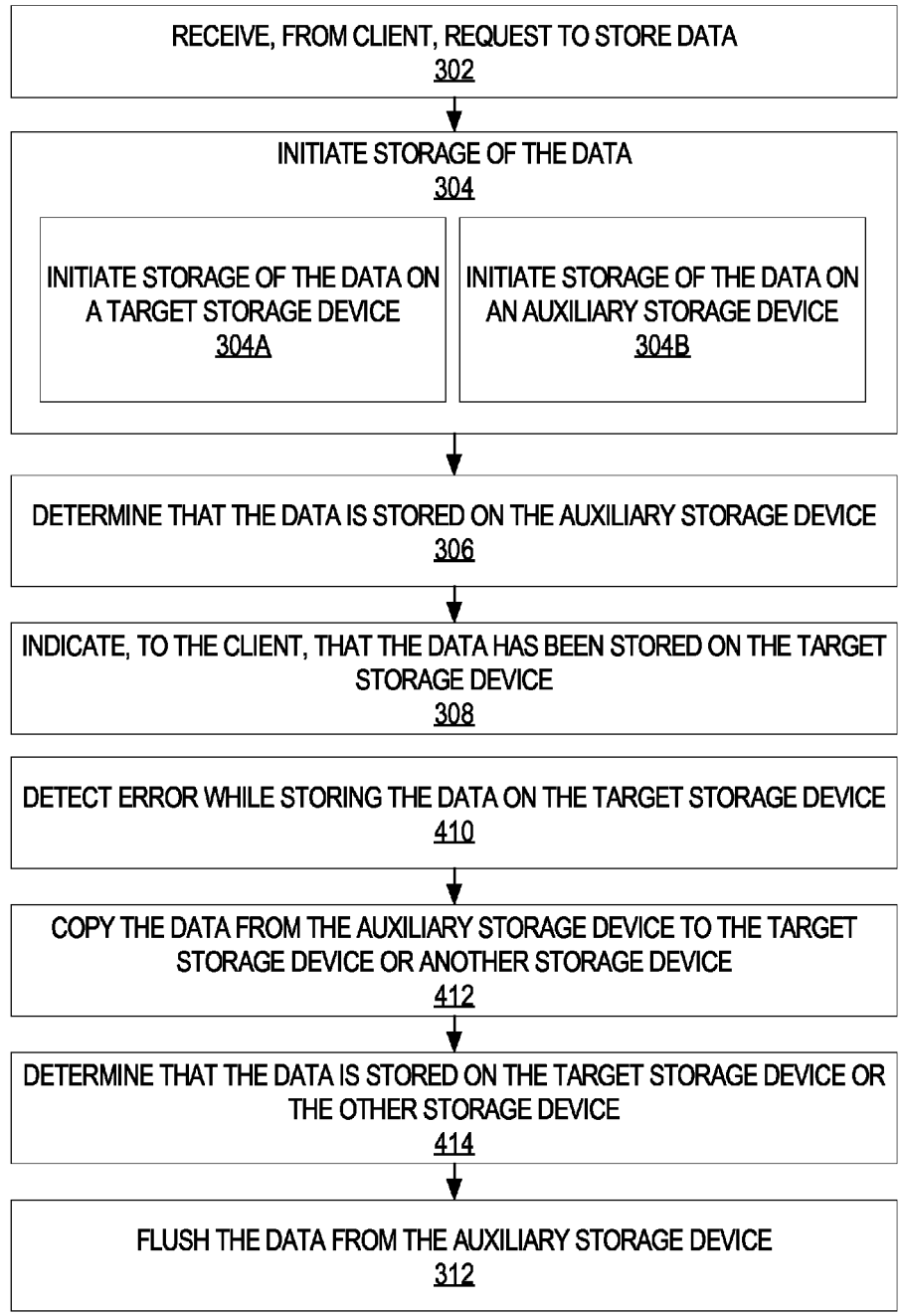
FIG. 4 illustrates an example process for confirming storage of data once the data has been stored on an auxiliary storage device, and recovering the data from the auxiliary storage upon failure to store the data on a target storage device.

FIGS. 3-4 illustrate example processes for providing an early confirmation to the client that the data has been written. As shown, the processes include, in step 302, receiving a request, from a client, to store data. In step 304, the process initiates storage of the data, including both: sub-process 304A for initiating storage of the data on a target storage device, and sub-process 304B for initiating storage of the data on an auxiliary storage device. In step 306, the process includes determining that the data is stored on the auxiliary storage device and, in responsive step 308, indicating to the client that the data has been stored on the target storage device.

In one embodiment, the auxiliary storage system includes multiple alternate subsystems that are cycled through as data is temporarily stored in the auxiliary storage system. For a given item of data, the storage server may initiate storage of the item on both: (1) a selected subsystem of the auxiliary storage system, and (2) the target storage system. The storage server may use different subsystems of the multiple alternate subsystems of the auxiliary storage system for different sets of data. If the storage server determines that one of the alternate subsystems has failed to store data, the storage server may deactivate the failed subsystem as one of the multiple alternate subsystems in the cycle. The storage server may also send a notification to a storage system administrator.

The target storage system and auxiliary storage system may be same types or different types of storage systems. In one example, the target storage system is a hard disk, and the auxiliary storage system is a flash storage system. As another example, the target storage system is a 5400 rpm hard disk, and the auxiliary storage system is a 7200 rpm hard disk. As yet another example, the target storage system is a 1 TB disk, and the auxiliary storage system is a 64 MB disk. Alternatively, the storage systems may be the same size and/or speed. Various forms of this example are provided herein with varying levels of detail. Other storage systems, now known or later developed, may be used as the target storage system and/or the auxiliary storage system without departing from various techniques described herein.

The storage server may confirm the storage of any item of data. In one example, the data is a database log item. The storage server may receive requests, from a client, to store multiple database log items. For each database log item, the storage server initiates, in parallel, storage of the database log item on two or more storage systems, even if the storage server is not storing the database log item redundantly. The storage server may confirm storage of the database log item even if one or more of the storage systems have not yet confirmed storage of the database log item.

The techniques described herein may be implemented as one or more processes performed by one or more computing devices, such as one or more specially programmed computing devices. The techniques may also be implemented as one or more computing devices having logic, in hardware, software, or an integrated combination thereof, for performing the one or more processes. The term "software," as used herein, refers to computer-readable instructions that are stored on one or more non-transitory computer-readable media and which may be read from the computer-readable media during execution of one or more software processes. The techniques may also be implemented as one or more non-transitory computer-readable media storing instructions which, when executed by one or more computing devices, cause performance of the one or more processes.

Using Flash Storage as a Pseudo-Mirror for Database Log Write Operations

In one embodiment, techniques described herein solve the challenge of providing low latency database log writes by utilizing a first type of storage system as a "pseudo-mirror" for a second type of storage system. For example, a fast storage system, on average, such as one or more flash storage devices may be used as a pseudo-mirror for one or more magnetic or optical disks. When a request arrives for a write to the database log, data is asynchronously written to both the first storage system where the log is maintained as well as the second storage system. For example, the data may be asynchronously written to disk storage and to flash storage. Whenever the first of either of these writes completes, the database log write request is acknowledged as having completed. Although disk writes are often fast (due to battery-backed caches in the disk controller), the disk writes can sometimes be slow due to the I/O load. At times when disk writes perform slowly (for example, due to a cache miss), the database system may proceed as if the database log has been written after the database log is written using alternate or pseudo-mirror writes to faster storage under the circumstances, such as flash. Allowing the database system to proceed as if the database log has been written, even before the database log is written to disk, may provide lower latency database log writes than if the system had to wait for database logs to be written to disk.

Unlike writing to a cache, the log data is written to both of the storage systems. Even if the write to flash completes first and is acknowledged, the corresponding write to disk or slower storage also completes; the log data on flash can be discarded in response to determining that the corresponding write has completed on disk. Similarly, even if the write to disk completes first and is acknowledged, the corresponding write to flash may also complete.

The log data stored on one of the storage systems, such as the flash storage system, may be discarded in response to receiving a notification that the corresponding write to the other storage system, such as the disk storage system, has completed. In one embodiment, keeping flash storage clear of logs that have written to disk causes the database system to use much less flash storage than if the flash storage were to store the entire database log. In one embodiment, the flash storage is used as a circular buffer that stores new log writes that may not have yet written to disk and expires or discards old log writes that have already written to disk.

Although various examples are described with respect to disk storage and flash storage, the techniques described herein may be applied using any two storage systems or storage techniques. For example, the techniques may be implemented using two different storage systems that store data using different physical storage components or using different storage processes. One of the storage systems may be, on average, faster at writing, more expensive, or newer than the other storage system. The faster system, more expensive, or newer system may be used as the pseudo-mirror for the slower, cheaper, or older system.

In one embodiment, disk write errors are handled after a successfully acknowledged write to flash. When a disk write error occurs after a successfully acknowledged write to flash, the log data on flash storage is saved and is not discarded. In one embodiment, the log write data continues to be saved in flash storage until it can be successfully written to disk, when the disk is repaired or restored. If the target disk is permanently lost, then, in one embodiment, the database handles the data loss by maintaining mirrored copies of the log. If the log is not mirrored, then data may be lost after a disk failure. If the log is mirrored, then the log data is not lost unless disk failure occurs for the original copy and for the mirror copy or copies.

In one embodiment, a log write request is received and handled by writing to the pseudo-mirror and acknowledging the write even if the I/O load on the disk system is heavy when the log write request was received. The log write request may be completed on the disk system even after the acknowledgment of the write. Techniques described herein may reduce the log write handling time for "outliers" of log writes to disk that far exceeded the average write latency to disk. Techniques described herein may also result in fewer outliers. In one embodiment, an outlier is much less probable when log writes are pseudo-mirrored to flash storage. An outlier may still occur even when the log writes are pseudo-mirrored to flash storage if (a) the disk system is slower than average to complete the write, and (b) the flash system is slower than average to complete the same write.

In one embodiment, techniques described herein allocate less flash storage for database logs, and use less flash storage to store database logs, than the amount of storage that would be used if the flash storage stored the entire database log. Flash storage may be utilized for providing low latency writes, and the disk storage may be used as the permanent storage for database log data. In one embodiment, the flash storage stores a window of log data, but does not store log data that was logged prior to the window. Storing only a subset of the log data, but providing flash storage write times for much or all of the log data, allows flash storage to be used much more effectively.

Waiting for log file data to be written can be one of the biggest bottlenecks on a database system, such as a Real Application Cluster ("RAC") system where data is often written to the log in order for other data to be shipped from one node to another node. When this kind of log write is slow, the performance of the entire RAC cluster can be affected. By providing consistent and fast log writes, in one embodiment, a database system using pseudo-mirror techniques removes log writes as a bottleneck. In one embodiment, the database system dramatically improves database performance. In one embodiment, the database system eliminates "hiccups" due to slow log writes. In one embodiment, the database system allows customers to run with smaller values for the Mean Time To Recover ("MTTR"), reducing potential recovery times.

In one embodiment, even if a database is not log-based, certain categories of writes may be high priority and rely on fast response times. The pseudo-mirror techniques described herein may be used to pseudo-mirror those certain categories of writes to two storage systems, a primary system and a pseudo-mirror system. A write may be acknowledged as completed in response to determining that either storage system has completed the write. Also, the write may be purged from the pseudo-mirror system in response to receiving a confirmation that the primary system has completed the write.

In one embodiment, a database system using pseudo-mirror techniques reduces the wait time for log file sync events such that the log file sync events are no longer top wait events, in terms of the total amount of time waited. In one embodiment, the pseudo-mirror techniques result in far fewer log write outliers. In one embodiment, an Oracle® database can maintain a steady throughput with no degradation or no noticeable degradation even when MTTR is substantially decreased.

In one embodiment, pseudo-mirror techniques add features for using flash storage to provide low latency log writes. In one embodiment, pseudo-mirror techniques increase performance for existing functionality. In one embodiment, an internal interface is provided for log write functionality. In one embodiment, use of pseudo-mirror techniques results in log write times that are improved statistically significantly beyond the expected log write times for the storage system(s) storing the log data. In one embodiment, use of pseudo-mirror techniques results in log write times with statistically significantly fewer outliers than the expected number of outliers for the storage system(s) storing the log data.

In various embodiments, once persisted, database logs may be read to recover data if the database crashes. Database logs may be read as logs are archived to possibly cheaper and slower storage systems. Database logs may also be read by applications that query logs, or by applications that replicate logs.

Storage Devices

A storage device is logic, in the form of hardware such as electronic circuitry, software such as stored instructions, or a combination thereof, that stores data. A storage device may include one or more physical or non-transitory machine-readable storage media on which the data is persisted. Alternately, the machine-readable media may be located on other devices, such as devices in a cloud storage system, which are managed by the storage device in a manner that is transparent to a client of the storage device. The storage device may also include logic, in the form of hardware such as electronic circuitry, software such as stored instructions, or a combination thereof, for retrieving the stored data. For example, the data may be retrieved from a machine-readable medium on which the data is persisted. Alternately, the storage device may store the data on a machine-readable medium, and another device may retrieve the data from the machine-readable medium. The storage device may store data, and may replace the stored data when the stored data is no longer relevant, whether or not the stored data has been accessed or retrieved.

In one embodiment, the storage device is a computer system complete with one or more CPUs and volatile memory. The CPU, pursuant to the execution of software, manages operation of the storage device.

In one embodiment, the storage device stores and provides access to data in units referred to as a data block. A data block is the atomic unit of data that a storage device client may request to read from and write to a storage device. A data block is associated with a data block address which uniquely identifies the data block and may uniquely identify the data block's storage location within a storage device. A storage device client may request a data block by the data block address or by a range of data block addresses.

When a storage device client requests a storage device to write a data block, the client receives, in response to the request, a commit acknowledgement acknowledging that the data block has been committed, that is, has been stored in a recoverable manner such on a non-volatile machine-readable medium. When the data block is requested by a client, the data block returned has a version for which a commit acknowledgement was most recently sent.

In write-back mode, a storage device writes the data block requested by a client to an intermediate storage device or storage location, such as a persistent cache device, and acknowledges the commit of the data block before the data block has been written to the target location that is mapped to the data block address. The storage device may also store an indication that the intermediate storage has a latest copy of the data that is different from the data stored at the target location and/or that the target location to which the block address is mapped might not have the latest copy of the data. For example, the indication may be stored as a flag in metadata that maps cache copies to data blocks in the target storage device and also tracks whether or not the cache copy has been updated from the version stored in the target storage device. The cached copy may later be written to the target location on the target storage device, and the stored indication may be updated to signal that the target location has the latest copy of the data.

The cache copy in intermediate storage may or may not be the latest version of the data upon an unexpected power down or failure of the storage device. The metadata persists beyond the failure and, when accessed, provides information about whether or not the cache copy is the most recent. If the cache copy is the latest version of the data, the data is recovered from the intermediate storage location rather than from the target storage location. Otherwise, the cache copy may be recovered from the target storage location.

Storage Server

A storage server is logic, in the form of hardware such as electronic circuitry, software such as stored instructions, or a combination thereof, that manages client requests to store information on one or more storage devices. For example, a storage server may receive data to be stored on one or more managed devices. In response to receiving the data, the storage server may initiate storage of the data on multiple managed devices. Each of the managed devices communicates with the storage server to indicate the success or failure of storing the data. In response to receiving confirmation that any one of the managed devices has successfully stored the data, the storage server confirms, to the client, that the data has been successfully stored. The confirmation to the client is called an "early confirmation" if the confirmation was sent in response to detecting that an auxiliary device has stored the data. The confirmation to the client is called a "normal confirmation" if the confirmation was sent in response to detecting that a target device has stored the data.

After an early confirmation, the storage server verifies that the data is eventually stored on the target device. If a write of the data to the target device encounters an error, the storage server may retry the write or may write the data to an alternate device, which becomes the target device. Once the data has been stored on a target device, the data may be cleared from the auxiliary device. Clearing data from the auxiliary device frees up space on the auxiliary device to facilitate other early confirmations.

The storage server may be any logic that manages client requests to store information on one or more storage devices. In one embodiment, the storage server is an Exadata Server. An Exadata Server is a storage system that is optimized for use with a database server. Exadata is a combination of software and hardware used to store and access an Exadata-aware database. The Exadata Server provides database aware storage services, such as the ability to offload database processing from the database server to storage, and provides this while being transparent to SQL processing and database applications.

Traditional storage devices are unaware that database files are residing in the managed storage and therefore cannot provide any database-aware I/O or SQL processing. When the database requests rows and columns, what is returned from the storage system are images of data blocks as persistently stored rather than the result set of a database query. Traditional storage has no database intelligence to discern the particular rows and columns actually requested. When processing I/O on behalf of the database, traditional storage consumes bandwidth, returning much data that is not relevant to the database query that was issued. By returning only the data required to satisfy SQL requests, less data is sent between the database servers and the storage servers. This means that data sent to the database server from the Exadata server may be comprised of rows that are persistently stored in different data blocks or even different compression units, and need not represent a disk image of any data block.

Exadata enables function shipping from the database instance to the underlying storage in addition to providing traditional block serving services to the database Exadata storage is able to return only the rows and columns that satisfy the database query criteria. For example, an Exadata server may be able to evaluate simple predicates that compare a column value to a constant or perform more complex predicates that have more than one constant or that require more than a memory comparison to evaluate, e.g. LIKE predicates and IN-lists. Exadata may contain a subset of the full capabilities of the database management server. This subset may include almost all functions and predicates that do not require any of: highly complex metadata support (such as XML), or advanced processing (such as LOBS and CLOBS), or use system functions that require access to the operating system kernel (such as retrieving information about the user's environment).

Eliminating data transfers and database server workload can greatly benefit data warehousing queries that traditionally become bandwidth and CPU constrained. Eliminating data transfers can also have a significant benefit on online transaction processing (OLTP) systems that often include large batch and report processing operations.

The Exadata software is optimally divided between the database server and Exadata cell. The database server and Exadata Storage Server Software communicate using a protocol that transparently maps database operations to Exadata-enhanced operations. A function shipping architecture is supported in addition to the traditional data block shipping provided by the database. SQL operations may be sent down to the Exadata cells for execution and query result sets returned to the database system. Instead of returning database blocks Exadata cells may return only the rows and columns that satisfy the SQL query. When offload processing is not possible, the Exadata server operates like a traditional storage device for the database server. But when feasible, the intelligence in the database system enables, for example, table scans to be passed down to execute on the Exadata Storage Server so only requested data is returned to the database server.

With Exadata storage, database operations may be handled more efficiently. Queries that perform table scans can be processed within Exadata with only the required subset of data returned to the database server. Row filtering, column filtering and some join processing (among other functions) may be performed within the Exadata storage cells.

Exadata provides column filtering, also called column projection, for table scans. Only the columns requested are returned to the database server rather than all columns in a table. For example, when the following SQL is issued, only the employee_name and employee_number columns are returned from Exadata to the database system.

SELECT employee_name, employee_number FROM employee_table;

For tables with many columns, or columns containing LOBs, the I/O bandwidth saved can be very large. When used together, predicate and column filtering may dramatically improve performance and reduce I/O bandwidth consumption. In addition, column filtering also applies to indexes, allowing for even faster query performance.

In one embodiment, an Exadata Server receives, from a client, data to be persisted in storage. In response, the Exadata Server initiates storage of the data on two or more storage devices. The Exadata Server receives an indication from one of the storage devices that the data has been written, and, in response, confirms, to the client, that the data has been persisted in storage. In one example, the Exadata Server provides an early confirmation when the data has been written to an auxiliary storage device other than the target storage device on which the data is eventually persisted. After the Exadata Server provides the early confirmation, the Exadata Server manages the storage devices to (a) verify that the data is persisted on a target storage device, and (b) clear the data from the auxiliary storage device.

Writing to Target Disk and Auxiliary Disk

In one embodiment, in response to a request to store data, the storage server initiates storage of the data on multiple storage devices either simultaneously or nearly simultaneously. For example, the storage server may initiate storage of the data on a first storage device and then, before receiving a write confirmation from the first storage device, on a second storage device. The storage server is said to initiate storage on the two storage devices "in parallel" because writes are or may be pending on both of the storage devices at the same time. In other words, the storage server does not wait for the first write to the first storage device to complete before initiating the second write to the second storage device. The storage server may receive a write confirmation from the first storage device before the second storage device, or from the second storage device before the first storage device. In some implementations, the storage server may initiate storage of the data more than two devices.

In one embodiment, the two devices include a target storage device and an auxiliary storage device. The request may or may not specify the target storage device. The target storage device is the device that stores or persists the dataset being modified by an individual item of data. For example, an entry may be added to a dataset that is stored on the target storage device using an insert operation, an existing entry may be modified in the dataset that is stored on the target storage device using an update operation, or an existing entry may be deleted using a delete operation. The target storage device stores a full collection of data items that are being written, and the auxiliary storage device stores only those data items that have not yet been cleared or discarded as having been written to the target storage device. In one example, the target storage device stores the database log or a part of the database log. The auxiliary storage device stores recently updated database log entries that have not yet been cleared or discarded as having been written to the target storage device. Queries for stored data may be executed against the target storage device, after the target storage device has been updated to include all of the entries relating to the stored data that were submitted prior to receiving the query.

In one embodiment, the storage server may cancel other pending writes upon determining that a write has completed on the target storage device. In another embodiment, the storage server may allow pending writes to complete even if a write has been reported as complete on the target storage device. The written data on the auxiliary storage devices may be marked as "discard" because the data has already been written to the target storage device.

Early Confirmation of Write to Target Disk

In one embodiment, after receiving a request to store data, a storage server provides, to a client, an early confirmation that the data has been stored. In response to the request, the storage server initiates multiple writes to multiple separate storage devices, including a target storage device and one or more auxiliary storage devices. In response to receiving confirmation that one of the storage devices has successfully written the data, the storage server confirms, to the client, that the data has been stored. A normal confirmation is due to successful storage on the target storage device, and an early confirmation is due to successful storage on an auxiliary storage device. In one example, the storage server sends, to the client on a customized connection between the client and storage server, a message or a response to the client's request to store the data. The response may indicate that the data has been successfully stored even if the data has not yet been stored on the target storage device.

FIG. 5 illustrates an example process for providing a normal confirmation to a client. After initiating storage of the data on both a target storage device (in step 304A) and an auxiliary storage device (in step 304B), the process includes determining that the data is stored on the target storage device in step 310. In response to determining that the data is stored on the target storage device, the process includes indicating, to the client, that the data has been stored on the target storage device in step 308. Also in response to determining that the data has been stored on the target storage device, the process includes flushing the data from the auxiliary storage device in step 312.

FIGS. 3-4 illustrate an example process for providing an early confirmation to a client. After initiating storage of the data on both a target storage device (in step 304A) and an auxiliary storage device (in step 304B), the process includes determining that the data is stored on the auxiliary storage device in step 306. In response to determining that the data is stored on the auxiliary storage device, the process includes indicating, to the client in step 308, that the data has been stored on the target storage device. The process may further include, as shown in FIG. 3, determining that the data is stored in the target storage device in step 310, and, in response, flushing the data from the auxiliary storage device in step 312.

Flushing Auxiliary Disk

In one embodiment, either before or after the storage server has confirmed storage to the client, the storage server receives an indication that the target storage device has successfully stored the data. In one embodiment, the storage server triggers flushing, clearing, or discarding of the data from the auxiliary storage device in response to the indication that the target storage device has successfully stored the data. The storage server may flush, clear, or discard the data from the auxiliary storage device synchronously or asynchronously with the receipt of the indication that the target storage device has stored the data. For example, the storage server may periodically flush multiple items of data from the auxiliary storage device after determining that those items of data have been written to the target storage device. As another example, the storage server may flush items of data from the auxiliary storage device immediately in response to determining that those items of data have been written to the target storage device.

In one embodiment, storage locations on the auxiliary storage device are marked as "discard" or "do not discard" depending on whether the data items stored at the storage locations are pending writes to a target storage device. If data items have not yet been confirmed as written to the target storage device, the storage locations storing those data items, or the data items themselves, may be marked as "do not discard." If the data items have been confirmed as written to the target storage device, the storage locations storing those data items, or the data items themselves, may be marked as "discard." Discarded data may be overwritten by other data. For example, the auxiliary storage device may store a later data item in a location that became available when an earlier data item was discarded. Storage of neither, either, or both of the data items may have resulted in early confirmation(s) to the client.

In one embodiment, each auxiliary storage device has a limited amount of storage, such as 32 MB. Once the auxiliary storage device is full, the storage server starts storing data at the beginning of the auxiliary storage device, in place of stored data that has been marked as "discard." In one embodiment, a head pointer and a tail pointer is maintained for each auxiliary storage device. The head pointer points to a next storage location for use in storing data, and the tail pointer points to an earliest storage location that has not yet been marked as "discard." The head pointer is updated as new storage requests are received by the auxiliary storage device. The tail pointer is updated as storage requests are completed by the auxiliary storage device. Data may continue to be stored on the auxiliary storage device, in a manner similar to a circular buffer, unless the head pointer catches up with the tail pointer.

As shown in the example process of FIG. 3, after providing an early confirmation to the client, the example process may include determining that the data is stored on the target storage device in step 310. In step 312, the data may be flushed from the auxiliary storage device. Once the data has been flushed, the space occupied by the data may be used to store other data items on the auxiliary storage device.

Recovery from Auxiliary Disk

In one embodiment, the storage server initially attempts to write data to both the auxiliary storage device and the target storage device. An early confirmation of the write may be provided to a client whenever the auxiliary storage device reports that the data has been written. If the data is not successfully written to the target storage device, then the data is recovered from the auxiliary storage device. The storage server may re-attempt to store the data on the target storage device. For example, the storage server may make a threshold number of re-attempts before storing the data on an alternate storage device. If the re-attempt(s) is/are successful, then the data may be cleared from the auxiliary storage device after the data has been stored on the target storage device. If the re-attempt(s) is/are unsuccessful, then the storage server may store the data on an alternate target storage device. In one embodiment, the storage server stores the data on an alternate target storage device without making any re-attempts to store the data on the initial target storage device. After the data has been stored on the alternate target storage device, the data may be cleared from the auxiliary storage device.

FIG. 4 illustrates an example process for recovering data from the auxiliary storage device. In step 410, the process includes detecting an error while storing the data on the target storage device. In step 412, the data is copied from the auxiliary storage device to the target storage device or another storage device, such as an alternate target storage device. In step 414, the process includes determining that the data is stored on the target storage device or the other storage device. In response to determining that the data is stored on the target storage device or the other storage device, in step 312, the data is flushed from the auxiliary storage device.

Example Embodiments

An OLTP workload can benefit greatly from fast response times for database log writes. If there are no application-related bottlenecks or contention for database locks and resources, one limiting factor in database system performance may be an amount of time spent waiting for redo log writes. Configuration of redo log groups or mirrored log files can have a negative impact on redo log write wait time. The database system waits to confirm the writes until the writes have completed on the slowest disk or device. Additionally, the storage devices themselves may experience occasional "hiccups" in performance. These spikes may have a huge effect in a RAC environment, where, in some cases, blocks may be shipped from one instance to another after a log flush. In one embodiment, pseudo-mirror techniques eliminate slow redo log writes as a potential bottleneck, and provide fast and predictable log write response times.

In one embodiment, the pseudo-mirror techniques include smart logging using flash-based storage by the Exadata® Storage Server Software. The logging is called "smart" because the logging involves more than merely placing the redo log on flash; duplexed and mirrored log files exist for several reasons. In one embodiment, a flash-based log is not added to the redo log group if the user does not have enough flash storage available. The flash-based log may be expensive even if the user has enough flash storage available to store the entire log, and using a flash-based log may still result in the user waiting for the write to complete on the slowest device.

In one embodiment, smart logging includes the following process: a storage system such as an Exadata® Storage Server receives a redo log write request, and, in response, the storage system issues asynchronous writes to the on-disk redo log as well as flash storage. The storage system notifies the database system when either of these writes has completed. If the hard disk is temporarily experiencing slow response times, then the flash disk will provide a faster response time; conversely, if the flash disk is temporarily experiencing slow response times (due to wear leveling algorithms, for example), then the hard disk will provide a faster response time. The Exadata® Storage Server may provide low redo log write latencies unless both hard disk and flash disk are slow at the same time, which might occur relatively infrequently. Note that the flash storage or other pseudo-mirror or secondary storage is not used as a permanent store for the redo data. The flash storage is just a temporary store for the purposes of providing fast redo write response times; the flash storage temporarily stores the redo data until this data is safely written to disk. In response to determining that an item of log data has been safely written to disk, the Exadata® Storage Server may clear the item of log data from the flash storage.

In one embodiment, the Exadata® Storage Server comes with a substantial amount of flash storage, and this storage is incorporated into the Exadata® Storage Server Software via the Smart Flash Cache feature. A small amount of the flash storage may be used for pseudo-mirroring the database log; the remainder of the flash storage can be used for the Flash Cache or for data storage, as the administrator sees fit. For example, the administrator may specify a certain amount of space to allocate for database logging purposes, and the certain amount of space may be significantly less than the amount of space that would be used to store the entire database log.

In one embodiment, the database system handles all crash and recovery scenarios without requiring any additional administrator intervention, beyond what would be normally given for recovery of on-disk redo logs.

Outliers

Outliers refer to those cases which fall outside the boundary of the majority. Redo write outliers may refer to redo writes whose latency is excessively large. In one embodiment, redo writes are considered as outliers if their latency is more than one millisecond. In one embodiment, Smart Flash Logging drastically reduces the number of redo write outliers.

Saved Redo

In one embodiment, "saved redo" occurs when (1) some redo log data is first written to flash, and therefore acknowledged to the Relational Database Management System ("RDBMS"); and (2) the write of the same redo log data to disk subsequently encountered an error. In one embodiment, the storage system accounts for saved redo in a manner that is transparent to the client and to the database server. The storage system may use the redo log data written to flash to write to another disk such that, according to the client and to the database server, the redo data has been written to persistent storage. Writing to another disk may be accomplished without further input from the database server or from the client beyond the request to write the log data.

In one embodiment, redo log data is not saved. In other words, if the RDBMS requests a subsequent read of the redo log data from disk, the storage system returns stale data and lets the RDBMS handle the stale data by retrying the read using the other mirror(s). Disregarding the saved redo may result in database corruption in the case of multiple failures in the primary and mirrored logs. Also, different database servers may not try mirrors in the case where they detect stale redo data (with an old log sequence number), and these different database servers may incorrectly infer the location of the end of the log and become stuck. In one embodiment, instead of stale redo data, a read error is returned if the RDBMS requests a subsequent read of the redo data from disk. In this embodiment, the storage system may keep track of disk locations that are associated with saved redo.

In another embodiment, redo log data is saved. In other words, if the RDBMS requests a subsequent read of the redo data from disk, the storage system returns the correct data from the saved redo. This embodiment may offer protection against multiple log failures. This embodiment may also involve more complex logic at the storage system due to the storage and maintenance of saved redo.

In one embodiment, redo log data is not saved, but instead the storage system issues a sufficient number of log switches. This embodiment may reduce the window of vulnerability for the failure of the log file mirror(s). In one embodiment, the Exadata® Storage Server is able to have a "reverse" channel to the RDBMS in order to request log switches. This embodiment might not provide protection if there is multiple log failure during the window of vulnerability.

In one embodiment, the storage system saves redo log data, and also issues a sufficient number of log switches. In one embodiment, the amount of time to preserve saved redo is minimized.

In one embodiment, the saved redo is stored on the system disk. In another embodiment, the saved redo is stored in the flash storage.

In one embodiment, saved redo occurs when a disk is pulled out or dies. For the former, the Smart Flash Logging logic may write the saved redo when the disk is restored, at which point we can delete the saved redo. For the latter, the Smart Flash Logging logic may delete the saved redo when the logic is notified that the disk has failed. In one embodiment, no user intervention is required in either case.

Example Smart Flash Logging Logic

In one embodiment, Smart Flash Logging logic meets the following goals:

1. writes redo log data to both hard disk and flash, and acknowledges to RDBMS as soon as either write finishes.
2. returns correct redo log data regardless of whether the most recent copy exists on flash or hard disk.
3. allows administrators to disable—either statically or dynamically—Smart Flash Logging for a specified cell, instance, or database.
4. allows administrators to view relevant metrics and alerts via CellCLI, EM, etc.
5. uses a negligible—but tunable—amount of flash storage for logging purposes.
6. disables the Flash Log on a flash disk if it is found to be slow, and re-enables the Flash Log if a flash card is replaced.
7. gracefully handles dropping of cell flash disks and grid flash disks by administrator.
8. handles saved redo in an efficient and graceful manner without requiring user intervention.
9. creates suitably sized Flash Log during upgrade of the Exadata Storage Server software, and destroys Flash Log during downgrade of the Exadata Storage Server software.
10. successfully and transparently handles all recovery situations, and does not pose a single point of failure:
    Failure of hard disk containing redo log after data is written to flash and acknowledged to RDBMS.
    Exadata® Storage Server Software death after redo log data is written to flash, but not disk, and acknowledged to RDBMS.
    Removal of flash card during run-time.

In one embodiment, Smart Flash Logging logic meets the following performance criteria in one or more benchmarks that involve the continuous generation of a large amount of redo data: (1) Although one goal of the Smart Flash Logging logic could address latency and not throughput, the Smart Flash Logging logic may show a measurable improvement in throughput benchmark results. (2) The Smart Flash Logging logic may cause a large decrease in the number of redo log write outliers. Additionally, the Smart Flash Logging logic might not have any measurable impact on the performance of other concurrent types of I/Os (database reads, writes, etc.).

In one embodiment, the Smart Flash Logging logic has no impact on the availability of the Exadata® server, except in the case of a restart after server death. In this case, the server may perform some recovery actions based on the contents of the Flash Log; however, these recovery actions might take a minimal amount of time. During this recovery period, the Exadata® server may not be able to service any requests.

Additionally, in the case of saved redo, if the Smart Flash Logging logic stores saved redo data on flash, the usable amount of Flash Log may become small enough so that Smart Flash Logging runs out of space. The Smart Flash Logging may revert to slowest-disk-to-write techniques when there is not enough flash storage available.

In one embodiment, the Smart Flash Logging logic scales regardless of how many instances or databases are concurrently requesting redo log writes or reads.

In one embodiment, the Smart Flash Logging logic and/or the Exadata® server logic are implemented in the form of one or more computing devices that are configured or programmed with specialized code in a programming language such as C++. In one embodiment, the specialized code is operating system dependent, and may, for example, depend on the Linux operating system. In one embodiment, the storage servers are operating according to a Linux environment, and the Smart Flash Logging logic is running within the Linux environment.

In one embodiment, the Smart Flash Logging logic provides simple and logical mechanisms for enabling and disabling the Smart Flash Logging logic for a given instance, database, or cell. Additionally, the Smart Flash Logging logic may provide relevant statistics, metrics, and alerts for access via CellCLI or Enterprise Manager ("EM"). CellCLI is an interface for monitoring, configuring, or maintaining storage cell utilities.

In one embodiment, the reliability of the Smart Flash Logging logic depends on the behavior of the disks—both flash and hard disk. The Smart Flash Logging logic is designed to provide low latency redo log writes in the event that one type of disk is temporarily slow; however, in case both types of disks are simultaneously slow, then the Smart Flash Logging logic might not produce as significant of a speed-up.

In one embodiment, specific roles or privileges are required to configure the Smart Flash Logging logic—on the RDBMS and/or the storage cells. For example, configuration may be restricted to administrators of the system.

In one embodiment, the Smart Flash Logging logic may be implemented entirely in the storage system without requiring any changes to the RDBMS.

In one embodiment, the Smart Flash Logging logic provides diagnostics to support effective problem analysis.

In one embodiment, the Smart Flash Logging logic is implemented with a negligible increase in the amount of memory used by the Exadata® storage server.

Smart Redo Log Writes

In one embodiment, the Smart Flash Logging logic uses a "dual-write" strategy. In one embodiment, when the Exadata® Server receives a redo log write request, the Exadata® server issues two asynchronous writes—one to the hard disk containing the redo log, and another to a flash disk. In response to completion of either write, the Exadata® server acknowledges the write completion to the RDBMS. If the hard disk write completes first, the Exadata® server does not need to do anything else from a recovery point of view. If the RDBMS subsequently requests a read of the same set of redo blocks from disk, the Exadata® server can satisfy that request by simply reading those blocks from disk since they contain the correct data. On the other hand, if the flash disk write completes first, in one embodiment, the Exadata® server preserves the redo data stored on the flash disk until the same redo data is successfully written to the hard disk. Additionally, if the corresponding disk write encounters an error after a successful write to flash, the storage system retains the relevant blocks of redo data on the flash disk until those same blocks are re-written to the same or another hard disk after the error. The relevant redo data may be purged, discarded, or cleared from the flash disk after the relevant redo data has been restored to a hard disk. Finally, if the RDBMS requests a read of the corresponding set of redo blocks from disk before the data has been written to disk (but after being written to flash), the Exadata® server may return the latest redo data, not the stale data which actually resides on disk.

In one embodiment, from an end user perspective, the system behaves in a completely transparent manner with respect to redo log writes and reads, i.e. the user is not—and does not need to be—aware that flash disks are being used as a temporary store. Similarly, the user does not need to provide input with respect to log data temporarily stored on the flash disk, or manage the transition of log data between the flash disk and the hard disk. The user may treat the log data on the flash disk as if the log data was already stored on a hard disk. In one embodiment, the only observable behavioral difference of the system is that the system provides consistently low latencies for redo log writes.

Administration within RDBMS

In one embodiment, a new init.ora hidden boolean parameter named "_enable_flash_logging" is provided to enable or disable use of smart flash logging. In one embodiment, according to a default setting, smart flash logging is enabled, and the setting may be changed during run-time via ALTER SYSTEM SET <parameter>. In one embodiment, the parameter is hidden to prevent unintentional or unnecessary disabling of Smart Flash Logging.

Administration within Exadata Server

In one embodiment, the Flash Log is exposed as a first class object, and the storage system provides a full set of functionality through an interface such as CellCLI. In one embodiment, exposing the Flash Log as a first class object provides a separate but logical set of administrative features that are consistent for the user. In one embodiment, exposing the Flash Log as a first class object allows the Flash Log to be independent of the Flash Cache. The independent nature of the Flash Log may allow users to configure each of the Flash Log and the Flash Cache separately, and disable either without affecting the other. In one embodiment, exposing the Flash Log as a first class object allows elaborate configuration options, such as a mechanism to specify which disks should contain the Flash Log.

In one embodiment, a new ALTER IORMPLAN syntax for enabling/disabling the Flash Log to allow the storage administrator to enable/disable the use of the Flash Log for certain databases/instances. In this embodiment, the user does not set any cellinit.ora parameters.

Creating a FLASHLOG

In one embodiment, the CREATE FLASHLOG command creates the Exadata® Smart Flash Log on a cell for redo log IO requests. An example syntax is provided below.

CREATE FLASHLOG [ALL [FLASHDISK]] [attribute_name=attribute_value [, attribute_name=attribute_value] ... ]

In the example, the CREATE FLASHLOG command accepts a list of comma-delimited flash cell disks. If a size is specified in the command, then that size is divided evenly across the cell disks; a minimum size of 16 MB per cell disk will be enforced for production systems. If a size is not specified, then a default of 512 MB is used.

In the example, the ALL FLASHDISK argument will create the Exadata® Smart Flash Log on all flash cell disks. If the ALL argument is not specified, then the cell disk attribute is specified. The FLASHDISK argument is not required.

In one embodiment, the CREATE FLASHCACHE command, by default, consumes all available space on each flash disk. In one embodiment, the storage system allows a user to first create the FLASHLOG before creating the FLASH-CACHE. In the example, both objects consume the amount of flash space specified by the user.

In one embodiment, if the user wishes to change the size of the Flash Log, the user may destroy the Flash Log(for example, via DROP FLASHLOG) and then recreate the Flash Log with the new specified size. Example commands are provided below.
CellCLI>CREATE FLASHLOG ALL
CellCLI>CREATE FLASHLOG ALL SIZE=1g
CellCLI>CREATE FLASHLOG ALL FLASHDISK
CellCLI>CREATE FLASHLOG CELLDISK='fd1,fd2,fd3,fd4'

In one embodiment, the CREATE CELL command includes a new FLASHLOG attribute having a numeric value such that: specifying FLASHLOG=0 suppresses the creation of a default-sized Flash Log; specifying FLASHLOG=n results in the creation of a Flash Log with the given size, divided equally among all flash disks.

Flash Log Size

In one embodiment, there is a maximum Flash Log size. In another embodiment, an entire flash disk may be dedicated to the Flash Log.

Describing the FLASHLOG

In one embodiment, a DESCRIBE FLASHLOG command causes a display of a list of attributes for the FLASHLOG object type. The following table lists example attributes for the example DESCRIBE FLASHLOG command.

| Attribute | Description |
| --- | --- |
| name | Unique name of the Exadata ® Smart Flash Log. |
| id | Global unique identifier (GUID) that is generated when the Exadata ® Flash Log is created. |
| creationTime | Timestamp when the Exadata ® Smart Flash Log was created. |
| status | Current status of the Exadata ® Smart Flash Log, such as normal (all flash disks are available), warning (some flash disks are unavailable), or critical (all flash disks are unavailable). |
| size | Total size of the Exadata ® Smart Flash Log. |
| cellDisk | Cell disk names that contain the Exadata ® Smart Flash Log. |
| degradedCelldisks | List of cell disks configured for cache but not currently available. |
| effectiveSize | Useable Flash Log size after deducting space on unavailable celldisks. |
| efficiencyPercentage | The efficiency of the Flash Log expressed as a percentage. |

An example use of the DESCRIBE FLASHLOG command is provided below:
CellCLI>DESCRIBE FLASHLOG
  name
  id
  creationTime
  status
  size
  cellDisk
  degradedCelldisks
  effectiveSize
  efficiencyPercentage Dropping the FLASHLOG In one embodiment, a DROP FLASHLOG command removes an Exadata® Flash Log from a cell. In one example, the storage system permits the user to drop the Flash Log at run-time, but the command may block the dropping operation until all redo data on flash is flushed to disk. In one embodiment, in the case where there is saved redo, "DROP FLASHLOG" fails and returns detailed information about the saved redo. In another embodiment, "DROP FLASHLOG FORCE" may destroy the Flash Log even if there is saved redo. Example commands are provided below.
CellCLI>DROP FLASHLOG
CellCLI>DROP FLASHLOG FORCE Listing FLASHLOG Attributes In one embodiment, a LIST FLASHLOG command causes display of the specified attributes for the Exadata® Smart Flash Log. Any attributes of the Flash Log object may be displayed. Example commands are provided below.
CellCLI>LIST FLASHLOG
  raw_FLASHLOG normal 100%
CellCLI>LIST FLASHLOG DETAIL
  name: raw_FLASHLOG
  id: 8a0adc84-9088-4c4e-8e1c-b6bcbd5cb1ba
  creationTime: 2010-01-23T12:34:56-05:00
  status: normal
  size: 1G
  cellDisk:
    c9FLASH0,FD_FLASH1_raw,FD_FLASH2_raw
  efficiencyPercentage: 100

FLASHLOG Resource Management

In one embodiment, the storage system allows administrators to control whether certain databases are allowed to use the Flash Log by enhancing the existing I/O Resource Management (IORM) infrastructure. For example, users can control Flash Log usage via the dbPlan and a new 'flashLog' attribute, e.g.: ALTER IORMPLAN dbPlan=((name='test', flashLog='off')). In the example, the value for the 'flashLog' attribute is 'on' or 'off'; and, if a database does not have an associated dbPlan directive, then Flash Log is enabled by default.

FLASHLOG Metrics

In one embodiment, Flash log metrics will provide information about the utilization of the Flash Log, such as the number of MB written per second. To display Flash Log metrics, users may specify an object type attribute of FLASHLOG with the METRICCURRENT, METRICDEFINITION, and METRICHISTORY objects. The following table lists example metric names and descriptions for example Flash Log metrics. The Flash Log for the metric is specified by the metricObjectName attribute of the METRICCURRENT and METRICHISTORY objects.

| Metric | Description |
| --- | --- |
| FL_IO_W | The number of writes serviced by Smart Flash Logging. |
| FL_IO_W_SKIP_LARGE | The number of large redo writes that could not be serviced by Smart Flash Logging because the size of the data was larger than the amount of available space on any flash disk. |

| Metric | Description |
| --- | --- |
| FL_IO_W_SKIP_BUSY | The number of redo writes that could not be serviced by Smart Flash Logging because too much data had not yet been written to disk. |
| FL_IO_W_SKIP_BUSY_MIN | The number of redo writes during the last minute that could not be serviced by Smart Flash Logging because too much data had not yet been written to disk. |
| FL_IO_DB_BY_W | The number of MB written to hard disk by Smart Flash Logging. |
| FL_IO_DB_BY_W_SEC | The rate which is the number of MB per second written to hard disk by Smart Flash Logging. |
| FL_IO_FL_BY_W | The number of MB written to flash by Smart Flash Logging. |
| FL_IO_FL_BY_W_SEC | The rate which is the number of MB per second written to flash by Smart Flash Logging. |
| FL_FLASH_IO_ERRS | The number of flash I/O errors encountered by Flash Log. |
| FL_DISK_IO_ERRS | The number of disk I/O errors encountered by Flash Log. |
| FL_BY_KEEP | The number of bytes of redo data saved on flash due to disk I/O errors. |
| FL_FLASH_FIRST | The number of times redo writes first completed to flash. |
| FL_DISK_FIRST | The number of times redo writes first completed to disk. |
| FL_FLASH_ONLY_OUTLIERS | The number of times redo writes to flash exceeded the outlier threshold. |
| FL_ACTUAL_OUTLIERS | The number of times redo writes to flash and disk both exceeded the outlier threshold. |
| FL_PREVENTED_OUTLIERS | The number of times redo writes to disk exceeded the outlier threshold; these would have been outliers had it not been for Smart Flash Logging. |
| FL_EFFICIENCY_PERCENTAGE | The efficiency of the Flash Log expressed as a percentage. |
| FL_EFFICIENCY_PERCENTAGE_HOUR | The efficiency of the Flash Log over the last hour expressed as a percentage. |

Database Metrics

In one embodiment, each database has the following example metrics.

| Metric | Description |
| --- | --- |
| DB_FL_IO_BY | The number of MB written to the Flash Log. |
| DB_FL_IO_BY_SEC | The number of MB written per second to the Flash Log. |
| DB_FL_IO_RQ | The number of I/O requests issued to the Flash Log. |
| DB_FL_IO_REQ_SEC | The number of I/O requests per second issued to the Flash Log. |

Flash Alert Logs

In one embodiment, the storage system provides the following example alert: StatefulAlert_FL_IO_W_SKIP_BUSY_MIN, which is a stateful alert based on a threshold for the FL_IO_W_SKIP_BUSY_MIN metric.

Handling of Saved Redo

In one embodiment, the storage system does not save redo. Instead, the storage system may rely on the use of mirrored log files. If Exadata® returns stale redo data to the RDBMS, in one embodiment, the RDBMS retries the read using a mirror. As long as the mirror has not also failed, then there is no danger.

In another embodiment, the storage system saves redo (somewhere on a system disk or in the Flash Log) as soon as the initial implementation is done. Saving redo protects the RDBMS against a double failure. Additionally, the storage system may include Exadata-initiated RDBMS log switches to reduce the amount of time that redo is saved. When the RDBMS switches log a sufficient number of times, the saved redo may be discarded.

Server Recovery

In one embodiment, server recovery (after death and subsequent restart) involves the process of scanning all of the flash logs and writing any log data which was not already confirmed to be written to the on-disk redo logs, as indicated by the checkpoint information in the header block of each Flash Log disk. Two events can pose challenges for recovery: flash disk read errors, and flash disk replacement. In one embodiment, in both of these cases, the storage system alerts the user by printing the relevant information to the alert log. As far as the actual redo data, in one embodiment, the storage system returns "stale" data when a read is requested; "stale" refers to the fact that the redo data will have an old log sequence number. In one embodiment, the storage system depends on the RDBMS to recognize the staleness and take the necessary actions, such as attempting to read the data from one of the mirrors.

Handling of Flash Disk Write Errors

In one embodiment, Flash disk write errors are handled in two different ways depending on what the Flash Log was trying to write: (1) if the write error was for Flash Log metadata in the header block, then the storage system disables that flash disk for future Flash Log usage and marks that flash disk as stale so that subsequent recovery is not performed; the flash disk may be re-enabled when the issues are resolved; (2) if the write error was for redo data, then the storage system simply logs the error and disables that flash disk for future Flash Log usage.

Slow Flash Disk Performance

In one embodiment, one result of slow flash disk performance is numerous outstanding flash I/Os; if the Flash Log detects that this is the case after a redo write request is received, then that request is written to hard disk only.

In one embodiment, Exadata® Storage Server Software detects a slow flash disk and notifies MS (the Exadata® Management Server), at which point MS causes Exadata® Storage Server Software to disable Flash Cache on the slow flash disk. Flash Log may also be disabled on the slow flash disk. Conversely, if a flash card is replaced, Flash Log may be re-enabled on the appropriate flash disks.

Performance

In one embodiment, Smart Flash Logging improves the performance of redo writes by providing consistently low latency and reducing the number of redo write outliers. When redo writes have high latency, even when this is due to just an occasional "hiccup", the redo writes can have a significant negative impact on database performance, especially in a RAC environment. In one embodiment, the Smart Flash Logging reduces the impact of logging by minimizing these hiccups.

Performance Attributes

In an example system that utilizes Smart Flash Logging logic, the Automatic Workload Repository ("AWR") wait event histogram statistics have few or no "log file parallel write" waits that are longer than one millisecond.

Performance Tuning

In one embodiment, the size of the Flash Log is tunable. If the size is too small, then the size may have a negative impact on performance by causing redo writes to bypass the Flash Log until enough space becomes available. However, in one embodiment, the storage system addresses the size issue by choosing an example default size (512 MB) that is large enough for several example embodiments. The storage system may also address the size issue by enforcing a minimum size of 16 MB per flash disk.

Administrative Interfaces

In one embodiment, CellCLI provides an interface for command-line tools, initialization parameter file "init.ora" parameters, user documentation and analytical model for new parameters and hints, GUI design elements, configuration files, and/or statistics and metrics.

Configuration Parameters

In one embodiment, the following new init.ora parameter is implemented on the RDBMS:
Name: _enable_flash_logging
Feature: Administration Within the RDBMS
Dependencies on Database Characteristics: None
Default value: TRUE
Range of Values: TRUE or FALSE
Controls: Whether Smart Flash Logging is enabled for redo log write requests from this database/instance.
Rationale: Administrators may wish to disable Smart Flash Logging for certain applications such as data warehousing.
Change Mechanism: ALTER SYSTEM SET "_enable_flash_logging"=TRUE|FALSE Change Impact: As soon as the parameter is changed, Smart Flash Logging will be enabled/disabled for this database/instance.

Availability

In one embodiment, use of the Smart Flash Logging feature has no impact on the availability of the Exadata® server, except in the case of a restart after server death. In this case, the server may perform some recovery actions based on the contents of the Flash Log. In one embodiment, the Exadata® server cannot service any requests during this recovery period.

Scalability

In one embodiment, the Smart Flash Logging logic is scalable regardless of how many concurrent I/O operations (redo log I/O as well as other types) are in progress.

System/Database Management (Enterprise Manager)

In one embodiment, the EM Exadata® Cell Plug-in is modified so that administrators can monitor Flash Log configuration and performance.

Design

In one embodiment, the Smart Flash Logging logic is programmed in C++. Similarly, the Smart Flash Logging logic may use operating system dependent code, for example, for Linux.

Database Configuration

In one embodiment, from a database perspective, the administrator's decision is whether to disable flash logging. By default, flash logging may be enabled, since almost all applications could benefit from lower redo log write latencies. However, the administrator could decide that if a given database or instance runs mostly query-intensive operations, the instance may not benefit from flash logging.

Performance Tuning

In one embodiment, the size of the Flash Log is tunable. If the Flash Log is too small, then this may be indicated by a high number of values for one of the following metrics: (1) FL_IO_W_SKIP_LARGE—The number of redo writes that were too large for the Flash Log; (2) FL_IO_W_SKIP_BUSY_MIN—The rate of redo writes per minute that had to bypass the Flash Log because too much active/current redo data on flash had not yet been written to hard disk.

If the Flash Log is too small, then the administrator may restart the Exadata® Storage Server with a larger Flash Log size.

Additionally, the value of the FL_IO_W_SKIP_BUSY_MIN metric may be high if there is a performance issue with the disks that contain the redo logs: if writes to these disks are consistently slow, then active/current data may fill up the Flash Log. In this case, the administrator may investigate the slow hard disks.

In one embodiment, if there are quality issues with the hard disks which contain the redo logs, then the quality issues may be indicated by the value of the FL_DISK_IO_ERRS metric, as well as the FL_BY_KEEP metric. Again, in this case, the administrator may investigate the problematic hard disks.

Reliability

In one embodiment, Smart Flash Logging does not reduce availability even in the case when the Flash Log runs out of space, or all flash disks are offlined. When the Flash Log runs out of space or all flash disks are offlined, the storage system may bypass the Flash Log and perform redo writes to hard disk only.

Portability

The Smart Flash Logging logic may be implemented on Linux or any other operating system.

Diagnosability

In one embodiment, the Smart Flash Logging logic accounts for a redo write to a hard disk that encounters an error after the same redo data was successfully written to flash and acknowledged to the RDBMS. In this event, the storage system creates "saved redo." Each time saved redo occurs, the relevant information is logged to the Exadata® Storage Server's trace file and alert log.

SGA/PGA Memory Usage

In one embodiment, the Smart Flash Logging logic uses slightly more memory than normal logging techniques on the storage system.

Client Interfaces

In one embodiment, administration within the Exadata® Server includes addition or modification of one or more of the following interfaces: command-line tools, initialization parameter file "init.ora" parameters, user documentation and analytical model for new parameters and hints, GUI design elements, configuration files, and statistics and metrics.

Installation

In one embodiment, if the user installs the appropriate version of the Exadata® Storage Server, then the user automatically has Smart Flash Logging installed: the Flash Log is created with a suitable default size, and Smart Flash Logging may be enabled by default.

Integration and Compatibility

In one embodiment, in a cache layer, redo writes are flagged if flash logging is disabled. In one embodiment, the Flash Log is a user-visible first class object to Oracle® Enterprise Manager ("OEM").

In one embodiment, unless a user has allocated all available flash space to flash grid disks, an Exadata® Storage Server upgrade script creates a Flash Log by using any available free space on flash Logical Units of Storage ("LUNs"), and then resizing the Flash Cache if necessary.

In one embodiment, if the user decides to downgrade the Exadata® Storage Server to a pre-Smart Flash Logging release, the prerequisite script checks for saved redo. If there is any saved redo, the script displays an error message and prevents the downgrade from proceeding. The user then verifies that the saved redo data is no longer needed. Once the user has taken the appropriate database actions, the user may execute "DROP FLASHLOG FORCE," which will destroy the Flash Log even if there is saved redo; and the prerequisite script passes on the next attempt. If there is no Flash Log at the time of the downgrade, any error as a result of executing "DROP FLASHLOG" may be ignored.

Design Examples

In one embodiment, the Flash Log component within the Exadata® Storage Server contains the following functionality:
1. Creation of Flash Log
2. Destruction of Flash Log
3. Fetching of Flash Log attributes and statistics
4. Handling of flash disk addition/removal
5. Re-routing of redo log write requests to both flash and hard disk
6. Handling of all types of write requests to determine if they affect the Flash Log
7. Handling of all types of read requests to determine if they are affected by the Flash Log
8. Dumping of Flash Log metadata to trace file (for state dumps)

System Placement

Most of the changes will be in the Exadata® Storage Server Software data path; almost all I/Os will be routed through the Flash Log component for preliminary processing. Management will be provided via CellCLI and MS.

Flash Log Stores

Each flash disk may have a portion of it allocated to the Flash Log; these portions are called Flash Log Stores and are basically hidden grid disks, similar to the ones which are associated with Flash Cache Stores. The Flash Log Stores will be created and destroyed as appropriate.

Creation

The Flash Log Stores and their corresponding hidden grid disks are created at these times:
  "CREATE CELL" is executed.
  "CREATE FLASHLOG" is executed. Note that in the case of an Exadata® software upgrade, the upgrade script will automatically create a Flash Log—in certain circumstances. This may be contingent upon being able to use any free space combined with the strategy of decreasing the size of the Flash Cache (the latter could involve dropping the Flash Cache and then re-creating it).
  We import a cell disk that contains a Flash Log Store; note that we will create a new Flash Log Store even if the Flash Log was explicitly created on a limited group of flash disks.
  We rescan a partition that contains a Flash Log Store, and the partition's on-disk information is different from what is cell_disk_config.xml.

Note that creation of a Flash Log Store involves clearing all of its contents; we don't want to incorrectly use stale data.

Destruction

The Flash Log Stores and their corresponding hidden grid disks are destroyed at these times:

"DROP CELL" is executed.

"DROP FLASHLOG" is executed. Note that in the case of an Exadata® software downgrade, the downgrade script will automatically drop the Flash Log—in certain circumstances. This is contingent upon the absence of any saved redo.

"DROP CELLDISK" is used to drop a cell disk that contains a Flash Log Store.

We rescan a partition that contains a Flash Log Store, and the partition's on-disk information is different from what is in cell_disk_config.xml.

Layout

This is the layout of a single Flash Log Store:
|Header Block|Available Space|Active Region with Un-flushed Data|Available Space Header Block The header block contains information about the Flash Log Store, especially with regard to recovery and saved redo. This information includes a version number, a checkpoint sequence number, an integer flag, a list of saved redo offsets, and a CRC.

The version number will be used to validate the format of the Flash Log header block.

The checkpoint sequence number is used for recovery; it denotes the highest sequence number of redo—from a particular Flash Log Store—that has been written to disk. Note that this is different from the RDBMS log sequence number. When we perform Flash Log recovery at Exadata® Storage Server Software startup, we will scan each Flash Log store for pieces of redo that contain a sequence number which is higher than its checkpoint sequence number; once we find such a piece, we will write it to disk. The checkpoint sequence number in the Flash Log Store header block will be updated on a periodic basis to reduce overhead; this interval will be approximately once every second.

The integer flag will indicate various pieces of information pertinent to the Store; the only current bit flag will indicate whether the Store contains saved redo. If the Store contains saved redo, it will not be considered for use by the Flash Log at run-time.

A list of disk offsets to pieces of saved redo which reside on the Flash Log Store.

A CRC for the entire block; this will help to validate the contents of the header block.

Circular Buffer of Available Space

All space after the header block is treated as a circular buffer for incoming redo write requests. At the beginning of this space will usually be some amount of redo which has been flushed to disk and flash, followed by an "active region" with un-flushed data, and finally followed by some more redo which has been flushed. When a new redo log write request arrives, the redo data will be written immediately after the active region, which now grows to encompass the new data.

Usage at Run-Time

When Exadata® Storage Server Software receives a redo log write request, we will choose a Flash Log Store that has enough free space for the request. Note that there is no static mapping between a given redo write request and the Flash Log Store that will be used for that data.

External File with Stale Flash Log GUIDs

This is a file which will reside on the system disk and will contain a list of stale flash disk GUIDs; all flash disks in this list will be considered to have stale redo data.

When a Flash Log Store is added, we will check if its GUID is in the stale list. If it is, we will not perform recovery and instead clear its contents; otherwise, we will perform recovery.

When a Flash Log Store is dropped, its GUID will be removed from the list in this file.

When a Flash Log Store is believed to possibly contain stale data, it is added to the list in this file.

External Files with Saved Redo

There will be a set of files which will reside on the system disk and will contain all saved redo. The files will be organized by grid disk GUID: there will be one saved redo directory per grid disk, and the name of the directory will be the grid disk GUID. When we create a new piece of saved redo, we will atomically create a new saved redo file in the appropriate directory.

Flash Log Redo Pieces

When Exadata® Storage Server Software receives a redo log write request, the data that will be written to the Flash Log will be slightly different from the data that is written to disk. For the Flash Log, we will take the redo and prepend a 512-byte header as well as bump the data size to the next 4K boundary. The Flash Log redo header will contain the following information:

A redo block header—The redo block header contents in a Flash Log will be uniquely different from a redo log block header in an RDBMS redo log.

A version number—The version number will be used to validate compatibility between the software and the on-disk format.

A sequence number—This sequence number is incremented for every piece that is written to the Flash Log, and is used for checkpoint purposes—all redo pieces which have a sequence number that is higher than the sequence number in the Flash Log header block will be written to disk during Exadata® Storage Server Software startup.

A database name—This will be the database name on behalf of which the redo was generated; it is not needed for the Flash Log implementation, but will be useful for diagnostics.

A timestamp—This will be the time that the redo data was received by the Flash Log component; again, this is not needed for the implementation, but will be useful for diagnostics.

A grid disk GUID and offset—These will identify where the corresponding redo belongs.

A redo piece size—This denotes the size of the original piece of redo; the size is used for application of current redo data to disk, and also helps to skip to the next piece after a stale piece is found. Note that this size does not include the 512-byte header or any trailing padding.

A CRC checksum for the entire redo piece—This will be used to verify the contents of the piece.

A CRC checksum for the entire Flash Log redo header—This will be used to verify the contents of the header.

Handling of Redo Log Writes

A redo log write request will be handled as follows:
1. If the new write request overlaps with any saved redo, write the saved redo first.
2. If the new write request overlaps with an existing pending write request to the same disk region, queue the new write request for future processing.
3. If the new write request overlaps with an existing write request in the active region, first try to do a checkpoint to flush the old write request. If the checkpoint does not flush the old write request, queue the new write request for future processing.
4. If there are no active Flash Log stores, simply issue the new write request to its target disk.
5. If the Flash Log is disabled for the target disk, simply issue the new write request to its target disk.
6. If the redo data fails verification, return an appropriate error.
7. Issue an asynchronous write request to its target disk; if this operation fails, do not use the Flash Log for this request.
8. Find the Flash Log Store that is least busy and has enough space for the new write request.
9. Allocate a new buffer to store the redo data as well as the 512-byte Flash Log header; if buffer allocation fails, cancel intent to issue a Flash Log write.
10. Prepare the Flash Log header and copy the redo data to the new buffer.
11. Issue an asynchronous write request to a Flash Log Store.
12. If the flash write finishes first successfully, send a 'success' acknowledgment to the client.
13. If the disk write finishes first successfully, send a 'success' acknowledgment to the client.
14. If the disk write finishes first unsuccessfully, send a 'failure' acknowledgment to the client.
15. Once both writes finish, complete the processing for the redo log write request.

Handling of Read Requests

In one embodiment, read requests are handled as follows:
1. If the new read request overlaps with any saved redo, write the saved redo first.
2. If the new read request overlaps with an existing pending write request to the same disk region, queue the new read request for future processing.

Exadata Storage Server Startup

At startup, we will perform recovery for saved redo and active redo.

Recovery of Saved Redo

For each saved redo file, we will try to write it to disk. For any saved redo which cannot be written, we will keep corresponding state in memory. Finally, the saved redo file will be deleted if its contents can be written to the appropriate target disk.

Recovery of Active Redo

For each Flash Log Store, we will first look up its GUID in the external list of stale Stores; if the GUID is in the list, then we will initialize the Store's contents and then remove the Store from the list. If a Store's GUID is not in the external list, recovery is performed, so we will do the following:

Read the Store's header to obtain the checkpoint sequence number.

Scan the Store, and write all pieces to disk which have a sequence number that is higher than the checkpoint sequence number. If we find a piece that belongs to an unavailable grid disk or a piece could not be written to a grid disk, we will check if this piece is already associated with a saved redo file—if it is not, then we will create a saved redo file. If we cannot create a saved redo file, then we will set the flag in the Store's header to indicate that the Store contains saved redo and so cannot be used for new redo data.

Update the Store's header with a new checkpoint sequence number (equal to the highest number that we saw in any pieces).

If the Store contains saved redo, then we will set its in-memory state to indicate that it is inactive (not available for new redo data).

Failure of Flash Disk with Flash Log Store

There are two different times at which failure can occur: startup and run-time.

Failure at Startup During Recovery

There are two different types of I/O errors that can occur during Exadata Storage Server startup:
1. The Exadata Storage Server encounters an error while trying to read redo from a Flash Log Store—In this case, we could potentially have stale redo data on disk, but we don't know which are the affected disks. In one embodiment, we choose to "carry on": return potentially stale redo for a subsequent read request, assume that the RDBMS will detect the staleness, and re-read the data from a mirror.
2. The Exadata Storage Server encounters an error while trying to update the Flash Log Store header—Since we don't update the header until after we have performed recovery, a complication is that we may have saved redo on a potentially bad flash disk. We can detect subsequent reads to these saved redo regions because we already put this information into our in-memory saved redo state, and we could therefore return errors for these reads.

For both of the above cases, we will mark this Store as inactive so it won't be considered for use at run-time, and also add the Store to the stale GUID list.

Failure at Run-Time

There are two different types of write errors that can occur during run-time:
1. A write error while trying to write redo to a Flash Log Store
2. A write error while trying to update a Flash Log Store's header (with new checkpoint information).

We will handle the first case in the following manner:

We will first mark this Store as unavailable for use by the Flash Log so that we do not consider it for future redo write requests.

We will continue to maintain in-memory state about the Store's active region. If a subsequent write request overlaps with data in the Store's active region, then we will add the Store's GUID to the stale list in the external file.

This will essentially cause us to treat this Store's contents as stale during any subsequent recovery.

We will handle the second case in the following manner:

We will first mark this Store as unavailable for use by the Flash Log so that we do not consider it for future redo write requests.

We will add the Store's GUID to the stale list in the external file.

Restoring of Flash Disk with Flash Log Store

Regardless of how/when a flash disk is restored, we will rely on the list in the external file to indicate whether a Flash Log Store contains current or stale contents. If the GUID is in the list, we can treat the contents as stale, not perform recovery, and we will initialize its contents.

Redo Log Disk Failure

There are three different times when we can encounter errors while trying to write redo:
1. During recovery, we encounter an error while trying to write saved redo.
2. During recovery, we encounter an error while trying to write active (non-saved) redo.
3. During run-time, we encounter an error while trying to write redo.

In all of the above cases, we will first mark the grid disk as not a candidate for future Flash Log use (to minimize the amount of saved redo for this disk), and then, in certain circumstances, save the redo (in the $2^{nd}$ and $3^{rd}$ cases). If we cannot save the redo in the appropriate external file, then we will mark the appropriate Flash Log Store as containing saved redo, and it essentially becomes read-only.

Restoring of Redo Log Disk at Run-Time

We will first try to apply any saved redo for the disk.

Exadata Storage Server Startup with Missing List of Stale Flash Log Store GUIDs

This can potentially happen after a cell rescue if the system disk became corrupted. In this case, we cannot trust the contents of any existing Flash Log Stores, so we will not perform recovery; we will then re-initialize all of the Stores' contents.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 1 is a block diagram that illustrates a computer system 100 upon which an embodiment of the invention may be implemented. Computer system 100 includes a bus 102 or other communication mechanism for communicating information, and a hardware processor 104 coupled with bus 102 for processing information. Hardware processor 104 may be, for example, a general purpose microprocessor.

Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Such instructions, when stored in non-transitory storage media accessible to processor 104, render computer system 100 into a special-purpose machine that is customized to perform the operations specified in the instructions.

Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

Computer system 100 may implement the techniques described herein using customized hard-wired logic, one or more ASICs or FPGAs, firmware and/or program logic which in combination with the computer system causes or programs computer system 100 to be a special-purpose machine. According to one embodiment, the techniques herein are performed by computer system 100 in response to processor 104 executing one or more sequences of one or more instructions contained in main memory 106. Such instructions may be read into main memory 106 from another storage medium, such as storage device 110. Execution of the sequences of instructions contained in main memory 106 causes processor 104 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 110. Volatile media includes dynamic memory, such as main memory 106. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 102. Transmission media can also take the form of acoustic or light waves, such as those generated during radio-wave and infra-red data communications.

Various forms of media may be involved in carrying one or more sequences of one or more instructions to processor 104 for execution. For example, the instructions may initially be carried on a magnetic disk or solid state drive of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector can receive the data carried in the infra-red signal and appropriate circuitry can place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card, cable modem, satellite modem, or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are example forms of transmission media.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118.

The received code may be executed by processor 104 as it is received, and/or stored in storage device 110, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   a storage server receiving, from a client, a request to store a single copy of data;
   in response to the request, the storage server initiating storage of at least two copies of the data by initiating, in parallel, storage of the single copy of data on each storage system of at least two separate storage systems;
   in response to determining that the single copy of data has been stored on at least one but fewer than all of the at least two separate storage systems, the storage server indicating, to the client, that the single copy of data has been stored;
   causing the single copy of data to be retained on fewer than all of the at least two separate storage systems by causing one or more copies of the at least two copies to be discarded from one or more storage systems of the at least two separate storage systems.

2. The method of claim 1, wherein determining that the single copy of data has been stored on at least one but fewer than all of the at least two separate storage systems comprises determining that the single copy of data has been stored on a first storage system of the at least two separate storage systems, the method further comprising:
   detecting a failure to store the single copy of data on a second storage system of the at least two separate storage systems;
   in response to detecting the failure, the storage server copying the SINGLE copy of data from the first storage system to a storage system other than the first storage system.

3. The method of claim 2, further comprising:
   in response to determining that the single copy of data has been copied to the storage system other than the first storage system, causing the single copy of data to be discarded from the first storage system.

4. The method of claim 1, further comprising allowing storage of the single copy of data to complete on all of the at least two separate storage systems, wherein storage of the single copy of data completes on at least one storage system of the at least two separate storage systems after indicating, to the client, that the single copy of data has been stored.

5. The method of claim 1, wherein the at least two storage systems comprise a first storage system that stores a first set of data that is awaiting storage on a second storage system but has not yet been confirmed as stored on the second storage system, and the second storage system that persistently stores a second set of data comprising the single copy of data.

6. The method of claim 1, wherein the storage server determining that the single copy of data has been stored on at least one but fewer than all of the at least two separate storage systems comprises determining that the storage of the single copy of data has been stored on a first storage system, further comprising:
   the storage server determining that a second storage system failed to store the single copy of data;
   in response to determining that the second storage system failed store the single copy of data, initiating storage of the single copy of data on a third storage system as an alternate to the second storage system.

7. The method of claim 1, wherein the storage server initiating, in parallel, storage of the single copy of data on each of at least two separate storage systems comprises the storage server initiating, in parallel, storage of the single copy of data on a first storage system and a selected subsystem of a second storage system, wherein the selected subsystem is one of a plurality of alternate subsystems of the second storage system, wherein the storage server uses different subsystems of the plurality of alternate subsystems for initiating storage of different sets of data, wherein the storage server determining that the single copy of data has been stored on at least one but fewer than all of the at least two separate storage systems comprises determining that the single copy of data has been stored on the first storage system, further comprising:

the storage server determining that the subsystem of the second storage system failed to store the single copy of data;

in response to determining that the subsystem failed to store the single copy of data, deactivating the subsystem as one of the plurality of alternate subsystems that are used by the storage server for initiating storage of different sets of data.

8. The method of claim 1, wherein the at least two separate storage systems comprise a hard disk storage system and a flash storage system.

9. The method of claim 1, wherein the single copy of data is a database log item.

10. The method of claim 1, wherein the storage server initiating, in parallel, storage of the single copy of data on each of the at least two separate storage systems is performed in a manner transparent to the client.

11. The method of claim 1, wherein, after the storage server indicates that the single copy of data has been stored, the single copy of data is maintained on a single storage system of the at least two separate storage systems and is not mirrored across the at least two separate storage systems.

12. The method of claim 1, wherein, after the storage server indicates that the single copy of data has been stored, the single copy of data is stored on all of the at least two separate storage systems, further comprising discarding the single copy of data from all but one of the at least two separate storage systems.

13. One or more non-transitory computer-readable media storing instructions which, when executed by one or more computing devices, cause:

a storage server receiving, from a client, a request to store a single copy of data;

in response to the request, the storage server initiating storage of at least two copies of the data by initiating, in parallel, storage of the single copy of data on each storage system of at least two separate storage systems;

in response to determining that the single copy of data has been stored on at least one but fewer than all of the at least two separate storage systems, the storage server indicating, to the client, that the single copy of data has been stored;

causing the single copy of data to be retained on fewer than all of the at least two separate storage systems by causing one or more copies of the at least two copies to be discarded from one or more storage systems of the at least two separate storage systems.

14. The one or more non-transitory computer-readable media of claim 13, wherein determining that the single copy of data has been stored on at least one but fewer than all of the at least two separate storage systems comprises determining that the single copy of data has been stored on a first storage system of the at least two separate storage systems, wherein the instructions which, when executed by one or more computing devices, further cause:

detecting a failure to store the single copy of data on a second storage system of the at least two separate storage systems;

in response to detecting the failure, the storage server copying the single copy of data from the first storage system to a storage system other than the first storage system.

15. The one or more non-transitory computer-readable media of claim 14, wherein the instructions which, when executed by one or more computing devices, further cause:

in response to determining that the single copy of data has been copied to the storage system other than the first storage system, causing the single copy of data to be discarded from the first storage system.

16. The one or more non-transitory computer-readable media of claim 13, wherein the instructions which, when executed by one or more computing devices, further cause allowing storage of the single copy of data to complete on all of the at least two separate storage systems, wherein storage of the single copy of data completes on at least one storage system of the at least two separate storage systems after indicating, to the client, that the single copy of data has been stored.

17. The one or more non-transitory computer-readable media of claim 13, wherein the at least two storage systems comprise a first storage system that stores a first set of data that is awaiting storage on a second storage system but has not yet been confirmed as stored on the second storage system, and the second storage system that persistently stores a second set of data comprising the single copy of data.

18. The one or more non-transitory computer-readable media of claim 13, wherein the storage server determining that the single copy of data has been stored on at least one but en fewer than all of the at least two separate storage systems comprises determining that the storage of the single copy of data has been stored on a first storage system, wherein the instructions which, when executed by one or more computing devices, further cause:

the storage server determining that a second storage system failed to store the single copy of data;

in response to determining that the second storage system failed store the single copy of data, initiating storage of the single copy of data on a third storage system as an alternate to the second storage system.

19. The one or more non-transitory computer-readable media of claim 13, wherein the storage server initiating, in parallel, storage of the single copy of data on each of at least two separate storage systems comprises the storage server initiating, in parallel, storage of the single copy of data on a first storage system and a selected subsystem of a second storage system, wherein the selected subsystem is one of a plurality of alternate subsystems of the second storage system, wherein the storage server uses different subsystems of the plurality of alternate subsystems for initiating storage of different sets of data, wherein the storage server determining that the single copy of data has been stored on at least one but fewer than all of the at least two separate storage systems comprises determining that the single copy of data has been stored on the first storage system, wherein the instructions which, when executed by one or more computing devices, further cause:

the storage server determining that the subsystem of the second storage system failed to store the single copy of data;

in response to determining that the subsystem failed to store the single copy of data, deactivating the subsystem as one of the plurality of alternate subsystems that are used by the storage server for initiating storage of different sets of data.

20. The one or more non-transitory computer-readable media of claim 13, wherein the at least two separate storage systems comprise a hard disk storage system and a flash storage system.

21. The one or more non-transitory computer-readable media of claim 13, wherein the single copy of data is a database log item.

22. The one or more non-transitory computer-readable media of claim 13, wherein the storage server initiating, in parallel, storage of the single copy of data on each of the at least two separate storage systems is performed in a manner transparent to the client.

23. The one or more non-transitory computer-readable media of claim 13, wherein, after the storage server indicates that the single copy of data has been stored, the single copy of data is maintained on a single storage system of the at least two separate storage systems and is not mirrored across the at least two separate storage systems.

24. The one or more non-transitory computer-readable media of claim 13, wherein, after the storage server indicates that the single copy of data has been stored, the single copy of data is stored on all of the at least two separate storage systems, the instructions, when executed, further cause discarding the single copy of data from all but one of the at least two separate storage systems.

* * * * *

UNITED STATES PATENT AND TRADEMARK OFFICE
CERTIFICATE OF CORRECTION

PATENT NO.         : 8,909,996 B2                                          Page 1 of 1
APPLICATION NO.    : 13/346656
DATED              : December 9, 2014
INVENTOR(S)        : Srinivasan et al.

It is certified that error appears in the above-identified patent and that said Letters Patent is hereby corrected as shown below:

In the Specification

In column 3, line 64, delete "on on" and insert -- on --, therefor.

In the Claims

In column 36, line 32, in Claim 2, delete "SINGLE" and insert -- single --, therefor.

In column 36, line 61, in Claim 6, delete "failed" and insert -- failed to --, therefor.

In column 38, line 35, in Claim 18, before "fewer" delete "en".

In column 38, line 43, in Claim 18, delete "failed" and insert -- failed to --, therefor.

Signed and Sealed this
Twenty-eighth Day of July, 2015

Michelle K. Lee
*Director of the United States Patent and Trademark Office*